United States Patent
Barclay et al.

(10) Patent No.: US 9,213,985 B2
(45) Date of Patent: *Dec. 15, 2015

(54) PROVISION OF TARGETED CONTENT

(71) Applicant: 5TH TIER LIMITED, London (GB)

(72) Inventors: Brewster Fahys Barclay, Withersfield (GB); Rufus Simon Tobias Evison, Cambridge (GB)

(73) Assignee: CLICKSTREAM TECHNOLOGIES PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,690

(22) Filed: Aug. 7, 2013

(65) Prior Publication Data

US 2013/0325936 A1    Dec. 5, 2013

Related U.S. Application Data

(63) Continuation of application No. 11/896,227, filed on Aug. 30, 2007, now Pat. No. 8,533,221.

(51) Int. Cl.
| | |
|---|---|
| G06F 7/00 | (2006.01) |
| G06F 17/30 | (2006.01) |
| G06Q 30/02 | (2012.01) |
| H04L 29/06 | (2006.01) |

(52) U.S. Cl.
CPC ...... *G06Q 30/0251* (2013.01); *G06F 17/30203* (2013.01); *G06Q 30/02* (2013.01); *H04L 29/06047* (2013.01); *H04L 67/42* (2013.01); *Y10S 707/99943* (2013.01)

(58) Field of Classification Search
None
See application file for complete search history.

(56) References Cited

U.S. PATENT DOCUMENTS

| | | | |
|---|---|---|---|
| 6,134,680 A | 10/2000 | Yeomans | |
| 6,671,259 B1 * | 12/2003 | He et al. | 370/238 |
| 6,763,383 B1 | 7/2004 | Evison et al. | |
| 7,289,519 B1 * | 10/2007 | Liskov | H04L 29/12066 |
| | | | 370/230 |
| 7,630,986 B1 | 12/2009 | Herz et al. | |
| 2005/0038702 A1 | 2/2005 | Merriman et al. | |
| 2006/0010225 A1 | 1/2006 | Issa | |

(Continued)

FOREIGN PATENT DOCUMENTS

WO    WO 2006/099583 A2    9/2006

OTHER PUBLICATIONS

Clickstream Technologies PLC, Aberdeen Group Profile, 2002 Aberdeen Group, Inc. Boston, USA.
Clickstream Technologies, extract from Bloor Research Report Analytics vol. 2—Predictive Analytics and Web Analytics, Bloor Research 2003, Milton Keynes, GB.

(Continued)

*Primary Examiner* — Uyen Le
(74) *Attorney, Agent, or Firm* — EIP US LLP

(57) ABSTRACT

Measures, including methods, apparatus and computer program products, are provided for amending content transmitted from a server to a client. The methods are performed by a system configured to communicate with the server and the client. A method comprises: configuring a domain name service to route requests for pages hosted at the server to the system; receiving a request from the client for a page hosted at the server, the request being received on the basis of the configuring; transmitting the request to the server; receiving a page from the server corresponding to the transmitted request; searching the page for a predetermined item of content; selectively amending the content of the page to form a modified page on the basis of whether the predetermined item of content is found; and transmitting the modified page to the client.

20 Claims, 48 Drawing Sheets

(56) References Cited

U.S. PATENT DOCUMENTS

| | | |
|---|---|---|
| 2007/0180147 A1 | 8/2007 | Leigh |
| 2007/0192181 A1 | 8/2007 | Asdourian |
| 2007/0239535 A1 | 10/2007 | Koran et al. |
| 2008/0052203 A1 | 2/2008 | Beyer |
| 2012/0173358 A1 | 7/2012 | Soroca et al. |

OTHER PUBLICATIONS

Contextual Advertising, http://www.grapeshot.co.uk/applications/contextual-advertising.php.

Datasherpa Marketing Solutions, Clickstream Technologies PLC, March 07v5.

Solving Web Measurement Problems with Datasherpa, Clickstream.

* cited by examiner

PROVISION OF TARGETED CONTENT

CROSS-REFERENCE TO RELATED APPLICATION

This application is a Continuation of U.S. patent application Ser. No. 11/896,227, filed Aug. 30, 2007. The disclosure of the prior application is herein incorporated by reference in its entirety.

BACKGROUND

Systems are available which provide targeted advertising within web pages, for example in the form of banner advertisements or links to other web pages. By targeting the advertisements, such that they relate to the content of a page on which they are displayed or to keywords which have been used for searching, the advertisements are more likely to be relevant to the user and the advertiser is willing to pay more for the placement of the advertisement.

The systems which provide targeted advertising use crawling to categorize web sites. This is a lengthy process by which huge numbers of web pages are analyzed and categorized and the resultant information is stored in a database. In some cases the advertising is tailored based on the individual user's browsing behavior and this behavior may be tracked using a cookie which is downloaded to the user's computer from a web site which they visit. Additional software may also be delivered which creates a log of the user's browsing activity which may then be returned to the system along with the cookie. Characteristics of the user may be determined based on the stored categorization data for those web sites visited by the user.

In order that an advertisement can be included within a web page, the web site publishers manually insert a tag in the web page which acts as a placeholder for the targeted advertisement. The tag is then replaced with a selected advertisement when the user requests the page, where the advertisement is selected based on stored data, which may comprise the user's browsing activity log and/or the categorization of web pages. The knowledge of the person's behavior may be stored by the advertising company and the only information on the browser side may be an ID which is linked to the information in the advertising company's database.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of providing services using a web marketing platform are described. The web marketing platform acts as a proxy associated with a host company and can intercept traffic passing to and from the host company. In an embodiment, an interface is provided which enables clients to easily request services. One example service is the provision of targeted content to users within web pages from sites hosted by the host company and in such an example, the actual content can be analyzed in real time to provide improved targeting based on the content, user behavior or any other criteria.

A method of creating display space in relation to a page requested by a client from a server for display by that client is described. The method comprises the steps of receiving at a first system configured to communicate with the client and the server a request from the client for a page from the server, prior to the receipt of that request by the server; and transmitting from the first system a reference to a frame-set to the client to cause the client to request that frame-set, wherein, at least one of the frames of the frame-set includes a reference to cause the client to display the page.

A method of amending content transmitted by a server to a client is described. The method is performed by a system remote from the client and the server and arranged to receive requests from the client to the server and to receive responses from the server to the client. The method comprises the steps of receiving a request from the client to the server for a page, prior to the receipt of that request by the server, transmitting the request to the server, receiving the page transmitted by the server in response to the request, prior to receipt of the page by the client, inserting content into the page to form an amended page, and transmitting the amended page to the client.

A method of amending content transmitted from a server to a client is described. The method is performed by a system configured to communicate with the server and the client and comprises the steps of receiving a page transmitted from the server to the client, prior to receipt of that page by the client, searching the page for a predetermined item of content, if the predetermined item of content is found, amending the content of the page dependent upon the item of content found to form a modified page; and transmitting the modified page to the client.

Methods of establishing a common user identity are described, wherein that a common identity is established utilising only first-party cookies. An identity is established by the transmission of a plurality of first-party cookies to the user, and the establishment of a relationship between those cookies. That relationship may be an identity common to the cookies, or may be maintained in a database. The methods may utilise redirection of a client between domains to establish the common identity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
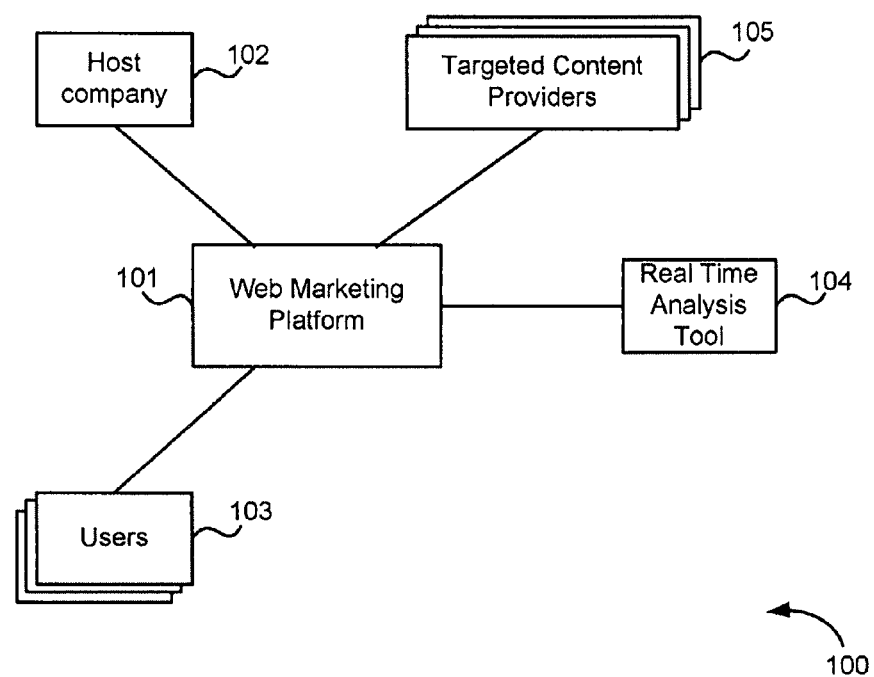
FIG. 1 is a schematic diagram of a system for providing dynamically targeted content.

FIG. 1 is a schematic diagram of a system 100 for providing dynamically targeted content. The system comprises a web marketing platform 101, a host company 102, one or more users 103, a real time analysis tool 104 and one or more targeted content providers 105. The system of FIG. 1 shows only some of the logical connections between entities. It will be appreciated that the communication between elements may be over dedicated point to point links or over a network (such as the internet). In some embodiments, there may be additional or alternative logical connections. One example of this would be a logical connection between the users 103 and the targeted content providers 105, without passing through the web marketing platform 101. This logical connection may be in addition to (or instead of) the logical connection between the targeted content providers 105 and the web marketing platform 101. Furthermore, in some examples not all traffic between the users 103 and the host company 102 may pass through the web marketing platform 101 (e.g. rules may be provided to determine which traffic does and which traffic bypasses the web marketing platform 101, for example based on traffic type, priority or any other metric). Some different embodiments are described below by way of example only and without limitation on the actual arrangement of elements.

Some or all of the entities shown in the system 100 of FIG. 1 may be co-located or may be geographically separated. For example, in some embodiments, the web marketing platform 101 and the host company 102 may be geographically separated and in other embodiments they may be co-located.

The web marketing platform 101 and the real time analysis tool 104 may each comprise a server or other computing device, such as that shown in FIG. 2 and described below. As described above, these two devices (e.g. two servers) may be co-located (e.g. located within the same server farm) or may be geographically separated. By locating the two devices within the same server farm, communications between the two can be very fast, although techniques described below may be used to ensure that the communication between the two is sufficiently quick even when they are remote from each other. The web marketing platform 101 may comprise a Datasherpa™ server as provided by Clickstream Technologies plc. The real time analysis tool 104 may comprise any suitable analysis tool (e.g. a look-up table or a complex analysis engine). In an example, the web marketing platform 101 and the real time analysis tool 104 may be combined into a single entity.

The targeted content providers 105 may comprise any content providers, including but not limited to, advertising companies or networks, news providers, companies wishing to advertise directly, (i.e. without using an advertising company or network) or any other content generating organization or individual. The content provided is targeted as a result of analysis performed by the real time analysis tool 104 in combination with the actions of the web marketing platform 101. The targeting may be content based targeting, behavioral targeting, a combination of behavioral and content based targeting, or targeting based on any other parameter.

The host company 102 may also comprise a server or other computing device such as that shown in FIG. 2 and described below. The host company stores web sites for its customers, which may be publishers, site owners and content providers, and makes the web sites available over the internet. The publishers, site owners and content providers may be any individual or entity (e.g. small businesses, large companies, charities, associations etc). The customers of the host company 102 for which it stores web sites are referred to herein as hosted companies.

The entities shown in FIG. 1 may be separate entities or may be combined in any manner. For example, the web marketing platform 101 and the real time analysis tool 104 may be combined. In another example, the web marketing platform 101 may also act as a targeted content provider 105.

Figure 2:
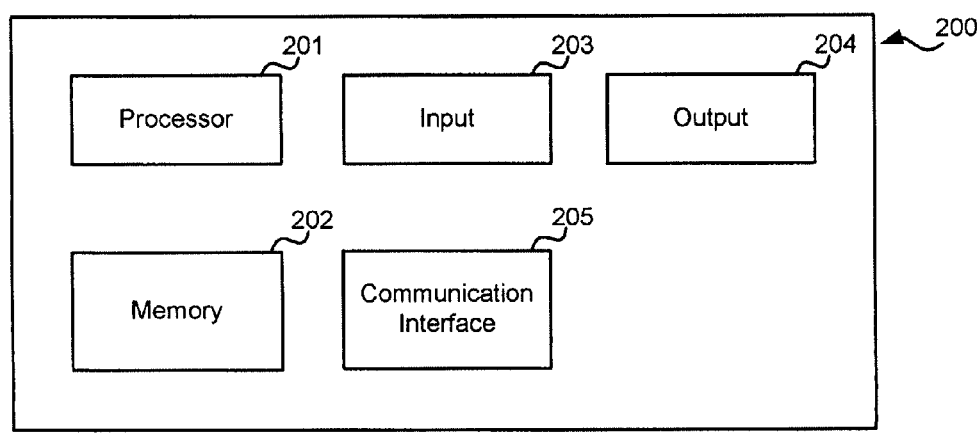
FIG. 2 illustrates various components of an exemplary computing-based device.

FIG. 2 illustrates various components of an exemplary computing-based device 200 which may be implemented as any form of a computing and/or electronic device, and in which embodiments of the methods described herein may be implemented. The computing-based device 200 comprises one or more processors 201 which may be microprocessors, controllers or any other suitable type of processors for processing computing executable instructions to control the operation of the device. The computer executable instructions may be provided using any computer-readable media, such as memory 202. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system or any other suitable platform software may be provided at the computing-based device (e.g. stored in memory 202) to enable application software (which may also be stored in memory 202) to be executed on the device. The computing-based device may also comprise one or more inputs 203 and/or one or more outputs 204. The input 203 may be of any suitable type for receiving media content, Internet Protocol (IP) input, user commands etc. The output 204 may comprise an audio and/or video output to a display system integral with or in communication with the computing-based device. The display system (not shown in FIG. 2) may provide a graphical user interface, or other user interface of any suitable type although this is not essential. The device 200 also comprises communication interface 205 through which the device is connected to one or more other devices over a network and/or over point to point links. The elements 201-205 within the computing-based device are connected by means of a bus (not shown in FIG. 2).

Figure 3:
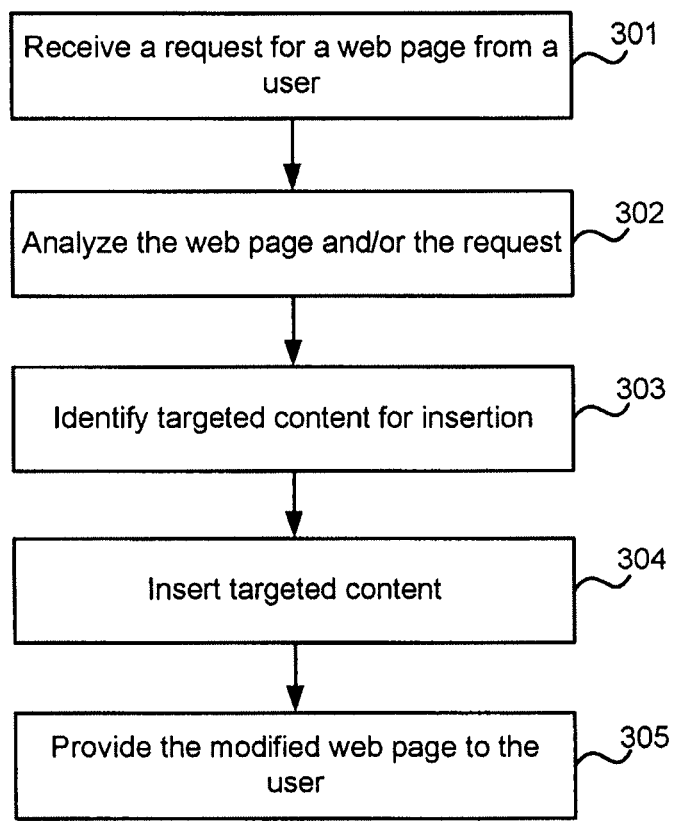
FIG. 3 shows a flow diagram of an example method of operation of the system shown in FIG. 1.

FIG. 3 shows a flow diagram of an example method of operation of the system 100 shown in FIG. 1. The web marketing platform 101 may act as a proxy for the host company 102 and intercept some or all the traffic between users 103 and the host company 102. Alternatively traffic may be redirected to the web marketing platform using any other technique (e.g. internal redirecting or DNS re-route). Upon receipt of a request for a web page from a user (block 301), the web page and/or the request is analyzed in real time (block 302) in order to identify targeted content for insertion (block 303). This targeted content may be content provided by one of the targeted content providers 105 or a tag for such content, and aspects of the targeted content are described in more detail below. The targeted content is inserted into the web page (block 304) and then the web page including the targeted content is provided to the user (block 305). The analysis may be performed by the web marketing platform 101 and/or the real time analysis tool 104. The content may be inserted (in block 304) by the web marketing platform 101 or the real time analysis tool 104. Aspects of the method are described in more detail below.

By analyzing the actual web page which is to be delivered to the user in response to their request and/or the request itself (in block 302), the analysis and targeting can take into consideration content which is dynamic and/or personalized, content which changes with time (or any other parameter) and user behavior over time. These types of content cannot be considered in systems which use data on web pages which is collected by crawling. Data which is collected through crawling is inherently historic data, as the data is based on web pages provided at some point in the past. Furthermore, web pages which are accessed on crawling are not intended to be provided to the particular user that issued the request and therefore do not contain any personalized content. In an example, some search engines or internet service providers (ISPs) enable users to display a personalized home page, which is provided via a particular host company. The personalization parameters may be set by the user and then used every time that user accesses the home page. A first user may therefore display news items relating to baseball, whilst a second user may display news items relating to fishing, even though the url accessed is the same. By analyzing in real time these differences in actual content displayed can be taken into consideration when providing targeted content, e.g. the first user may be given baseball or other ball sports related content whilst the second user may be given fishing related content. If the same url was accessed on crawling, a generic page would be received and analyzed, without any of the personalized content and therefore any additional content provided could not be targeted appropriately.

The analysis which is performed (in block 302) may be performed based on the request and/or the web page itself. Aspects of the request or web page which may be considered include, but are not limited to:

- the referrer, i.e. the web page from which the request is generated. This may for example be a search engine (e.g. www.google.com) or a site which has a link on it (e.g. news.bbc.co.uk has a link on it to www.bbc.co.uk/weather).
- the referrer content, i.e. the actual content of the referrer page
- the current url, i.e. the url that is requested
- the current content, i.e. the actual content of the page which is to be delivered in response to the request
- meta tags in the page that is requested
- search terms (e.g. inserted in a search engine to arrive at a page)
- form field data
- the user profile, i.e. data relating the user who issued the request, such as demographic data
- the user behavior, e.g. user behavior on a site, across sites or over many sites. Aspects of behavior may include time spent on a page or any other metric.
- history of any or all of the above.

Dependent upon the aspects which are considered, the analysis may be performed by the web marketing platform 101 and/or the real time analysis tool 104. In an example, the user profile may be maintained at the web marketing platform and updated based on the results of the real time analysis performed by the analysis tool.

Any one or more of the aspects of the request or the web page described above may be analyzed in order to generate data (such as a metric) which can be used in the identification of suitable (i.e. targeted) content for insertion into the web page. Where more than one aspect is considered, any suitable algorithm may be used to combine the factors. The generated data may comprise, but is not limited to:

- Information which helps define the relevant content of a web page, which may comprise any of the variables listed above or sets of keywords or categories etc. This may be referred to as a 'content profile'.

Information which helps define the user requesting the web page, which may be based on the content of this page and also on previous activities (e.g. on sites hosted by the host company or an associated host company). This may be referred to as a 'user profile'.

Categorization, i.e. details of categories which are relevant to the request/web page/user etc.

Category mapping, i.e. a mapping between categories used by the web marketing platform/real time analysis tool and categories defined by any of the targeted content providers 105. This enables the web marketing platform 101 to interface to any content provider's system.

Any of the individual aspects of the request or web page detailed above which are input to the analysis, e.g. the real time analysis tool may select one or more aspects which are most appropriate in a particular circumstance.

In addition to, or instead of, generating data, an action may be generated. For example, the analysis may search for keywords that suggest terrorist or other criminal activity and identification of such a keyword may trigger an alert to the relevant authority.

Figure 4:
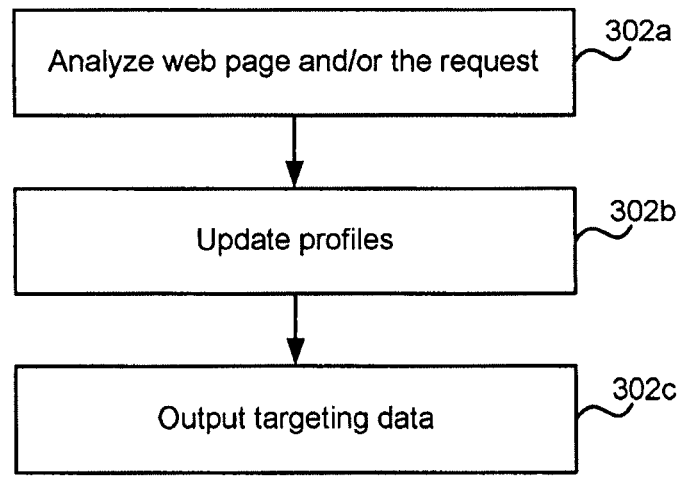
FIGS. 4-7 show examples of steps of FIG. 3 in more detail.

FIG. 4 shows an example of the analysis step (block 302) in more detail, which comprises analyzing the page/request (block 302*a*) and updating stored profiles based on this analysis (block 302*b*). Targeting data is then output (block 302*c*) which may be based on the profiles and/or the results of the real time analysis. The profiles may be stored at the web marketing platform 101, the real time analysis engine 104 or any other entity and updated upon any browsing activity by that user on domains which are hosted by the host company. Where there are agreements between host companies or between the web marketing platform operator (or provider) and multiple host companies, and/or where host companies are part of a network that shares profile information, then the profile data may be based on a wider range of browsing activities. In other examples, the profiles may be stored by the targeted content providers 105, e.g. where the targeted content which is inserted comprises a behavioral tag (as described below).

As the analysis is performed dynamically in real time, it is not necessary in advance to install fixed static tags into web pages to monitor the web pages (referred to as tracking tags) or to provide details of the type of content within the web page based on external analysis (referred to as content tags). This manual tagging process is a labor intensive activity which is also prone to human error. Use of dynamic analysis eliminates human involvement and therefore eliminates the possibility of human error.

The web marketing platform 101 is associated with the host company 102, such that some or all traffic to and from pages hosted by the host company passes through the web marketing platform. Any suitable technique may be used to ensure that the traffic flows in this manner. This association does not imply that the web marketing platform 101 and the host company 102 are necessarily co-located and in some embodiments they may be geographically separated. The association also does not imply that the web marketing platform is necessarily operated by the host company, although in some embodiments this may true.

As a result of this association between the web marketing platform and the host company, the data analyzed may be site-centric (or group of sites centric) and is not limited to being user-centric, as would be the case if the web marketing platform was associated with an internet access provider. By being associated with the host company, the web marketing platform can develop very broad user behavioral profiles by tracking their access of any of the web pages hosted by the host company (which may comprise hundreds or thousands of domains) and potentially by other host companies (where relationships exist, as described above). This compares to the data which can be obtained by tracking a user's access to a particular domain (e.g. www.bbc.co.uk) which will only provide information on a limited set of user characteristics. Details of the methods by which the user activities may be tracked are described below.

In some examples, it may be necessary for the hosted company (e.g. site publisher or owner) to grant permission for use of their site to be tracked by the web marketing platform. However, as each hosted company has a relationship with the host company, this may be part of the standard terms and conditions in relation to the hosting service provided by the host company. As described herein, the tracking of the use of their site offers large potential benefits to the hosted companies.

Figure 5:
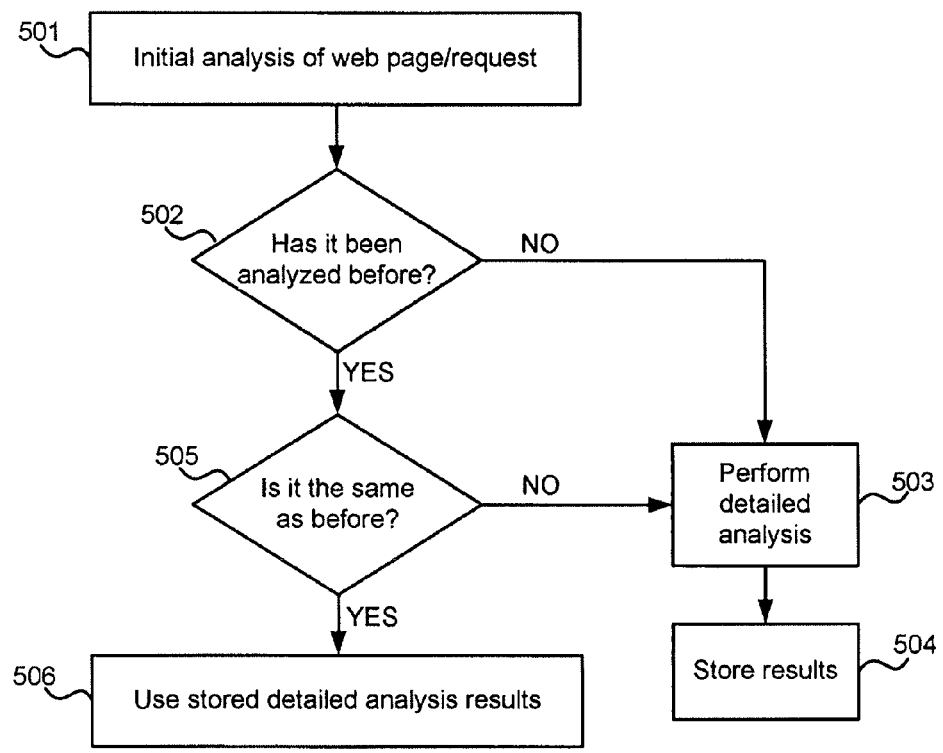

Whilst the analysis is performed in real time on the actual content which is to be delivered to the user, in some embodiments the analysis may use stored data. Examples of stored data which may be used include the profiles or history described above. In some examples, as shown in FIG. 5, the analysis may be performed in a number of stages. Firstly, the initial analysis is performed (block 501) to enable determination of whether the page has been analyzed before (in block 502). This initial analysis may be based on the page title, url (uniform or universal resource locator) or header or alternatively on textual or visual analysis of the page. In an example, the header for a page may include an update date or revision number. If the web page has not been analyzed before ('No' in block 502), detailed analysis is performed (block 503) and the results stored (block 504). If however, the web page has been analyzed before ('Yes' in block 502), a check may be performed to determine whether the page is different to the version that was previously analyzed (block 505). Any difference may be due to personalized content or to changes in the content since it was analyzed. If the page currently being delivered is the same as that previously analyzed ('Yes' in block 505), the stored analysis results may be used (block 506), whilst if the page is different ('No' in block 505), detailed analysis is performed (block 503) and then stored (block 504). In some cases, it may not be necessary to determine if the page is different (block 505) because this information may be apparent as a result of the initial analysis, e.g. from the update date or from information in the header identifying whether the page includes dynamic/personalized content. Where this determination is not necessary, the method may proceed from determining that the page has been previously analyzed ('Yes' in block 502) to using the stored detailed analysis results (block 506).

Referring back to FIG. 3, following the analysis of the web page and/or the request (block 302), the output of the analysis (referred to herein as the 'targeting data') is used to identify targeted content for insertion into the web page (block 303). This targeted content may, for example, comprise:

an advertisement
a link
a news article or headline
other text or content
a tag for any of the above
a behavioral tag.

A tag for an advertisement, link, news article, headline or other text or content may include instructions to access content from the web marketing platform 101 or directly from one of the targeted content providers 105 or from another entity. A behavioral tag may, for example, comprise an increment on the user profile. In an example, where analysis of the request or the content determines that a user has accessed a plumbing site, the tag may comprise data which changes the user profile by incrementing the count for 'plumbing'. The updated user profile may be used for concurrent or future content delivery (using the web marketing platform or other method) so that content delivered is of improved relevance to the user.

Figure 6:
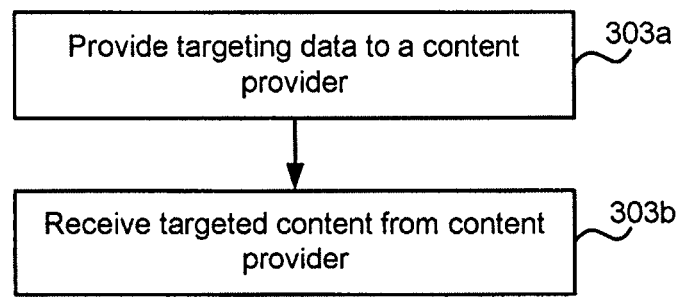
Figure 7:
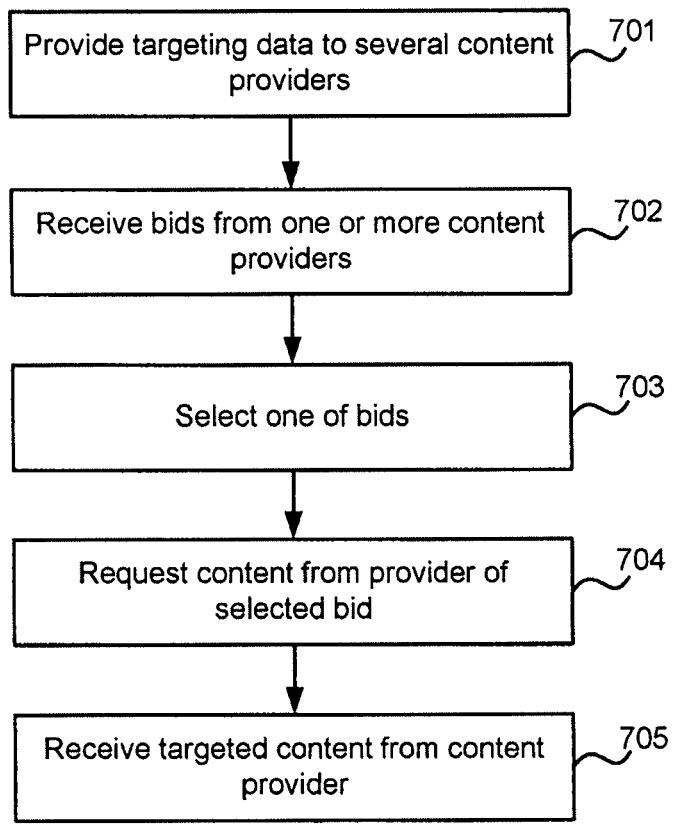

FIG. 6 shows a first example of the insertion step (block 303) in more detail, in which the targeting data is provided to a content provider (block 303a) and in return targeted content is received from the content provider (block 303b). In some examples, however, the targeting data may be communicated to more than one targeted content provider 105 to enable real-time bidding for the opportunity to provider content. FIG. 7 shows an example of the insertion step in such an embodiment, in which the targeting data is provided to several content providers (block 701). Each of the content providers may then provide the web marketing platform with a bid to provide targeted content (block 702). On the basis of the bids received (in block 702), one of the bids may be selected (block 703). In one example, the content to be provided may be included within the bids, however where the content is not included within the bid, once a winning bid has been selected, the content is requested from the appropriate content provider (block 704) and subsequently received by the web marketing platform (block 705). In another example, a tag relating to the winning bid may be inserted by the web marketing platform 101 (where this tag is considered the targeted content), such that the user's browser requests the actual content from the provider of the selected bid (block 704) and then receives (block 705) and displays that content. Whilst FIG. 7 shows one of the bids being accepted, where a reserve price or other conditions are set, there may be situations where none of the bids are accepted.

The targeting data provided to each of the content providers (in block 701) may be the same or different. For example, the content providers may use different categories and therefore different category mapping data may be provided within the targeting data or the targeting data may be mapped for each content provider before it is sent. Dependent upon the categories used by the content providers, and/or the service levels agreed, content providers may receive data with different degrees of detail or granularity (e.g. data relating to 30 categories compared to data relating to 3000 categories).

In some cases, the content providers may be bidding to provide equivalent content, e.g. bidding to provide different advertisements to be inserted within the web page provided to the user, however in other examples, different content providers may bid to provide different types of content. For example, an advertising network may bid to provide an advertisement whilst a news provider may bid to provide a news article. In such cases, more than one bid may be accepted, e.g. one bid for each content type. In other examples, more than one bid for the same type of content may be accepted, e.g. where more than one advertisement can be included within the web page. However, where the different advertisements have different characteristics, e.g. size, prominence on the page etc, the bids may be handled separately because they may have different commercial value.

Use of real time bidding and/or real time content insertion enables the commercial value of the targeted content to be established based on the actual user who is requesting the page and the actual content of the page on which the targeted content is to be inserted. These factors may influence the value of any targeted content considerably. For example, a user who has visited a number of plumbing sites over a period of time but then uses the search terms 'plumbing' and 'order' to access a further plumbing web site, may be a user looking to make an actual purchase and therefore the value of providing plumbing advertisements to that user may be higher than to other users and also the value may be higher than the value of providing plumbing advertisements to the same user in the past.

The type of content identified (in block 303) may be limited by conditions set by the publisher or web site owner, e.g. no advertisements which relate to pornography, no advertisements from competitors etc. Such conditions may be registered with the host company through a user interface or verbally (e.g. by telephone).

In addition to, or instead of, using the targeting data to identify content for insertion (in block 303), the targeting data may be used to instigate an action. The action may comprise, for example, shutting down an entity (e.g. the web marketing platform 101 or the host company 102), preventing access to a web site (e.g. one hosted by host company 102), sending an email or other alert or changing future operation of the web marketing platform 101 or the real time analysis tool 104. In an example, the analysis tool may determine that a user has won a competition, with the result that future requests from that user and/or other users are handled differently.

The identified content may be inserted (in block 304) through the addition of the content or a tag for the content (as described above). The insertion may, in some examples, involve the replacement of content within the web page, e.g. replacing an advertisement with another advertisement, or replacement of the web page by an different web page. The replacement of a tag or a portion of the web page may be achieved by searching for existing tags and replacing them or by searching for content (textually or visually) and replacing the content by the new content or a tag for that content. An example of a visual search technique is the image search technology provided by Cambridge Ontology. In some examples space may be generated within the web page for insertion of the content, for example by displaying the web page within a frame and inserting the targeted content outside the frame or in another frame. In another example, the targeted content may be provided in a pop-up window or in a page inserted between web pages (which may be referred to as a bridging advertisement). In a further example, the targeted content may be provided instead of the requested content. Further examples of methods of space creation are described below.

Whilst FIG. 3 shows the insertion of the content by the web marketing platform (block 304), in other examples, the content may be inserted using any other suitable mechanism or network element e.g. by the real time analysis tool.

In an example, the web marketing platform 101 may be operated by the host company 102. This may be under agreement (e.g. a license agreement) from the web marketing platform provider. In another example, the web marketing platform 101 may be operated by a third party, which may be the web marketing platform provider or any other party. The term 'web marketing platform provider' is used herein to refer to the entity that develops and/or owns the web marketing platform technology (which may comprise software and/or hardware), which it may provide to other entities (e.g. under an agreement). The term 'web marketing platform operator' is used herein to refer to the entity which runs and manages the web marketing platform. Revenue generated as a result of the operation of the web marketing platform may be for the benefit of either or both the web marketing platform provider and the web marketing platform owner, dependent upon the specific circumstances and the terms of any agreements in place.

Figure 8:
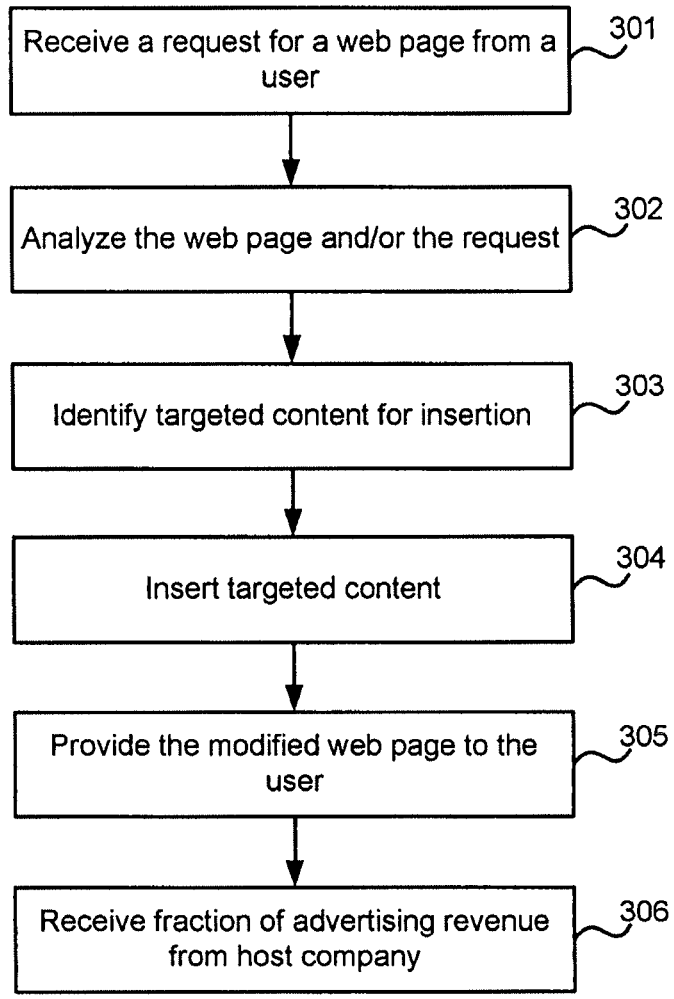
FIG. 8 shows a second flow diagram of an example method of operation of the system shown in FIG. 1.

The web marketing platform operator/provider may generate income through a revenue sharing agreement with the host company, with the publishers or site owners whose sites are hosted by the host company, with the targeted content providers or with any other entity. In each case, the web marketing platform operator/provider may receive a fraction of the advertising revenue, as shown in FIG. 8 (block 306), where the fraction may be any fraction up to and including all of the revenue, e.g. where free hosting is provided in return for 100% of the advertising revenue. In some situations, there may be multiple revenue sharing agreements, and some examples of this are described below.

In addition to, or instead of, generating revenue through a revenue sharing agreement, as described above, the operator/provider of the web marketing platform 101 may generate revenue through the sale of the profile information that it collates (e.g. the content or personal profiles). The information sold may comprise data which has not been collated, e.g. information on the content of a page and/or a user requesting a page, which may then be collated by the purchaser of the data. In an example, a behavioral targeting advertising company may buy information every time the content/request is identified as relating to plumbing. The behavioral targeting advertising company may then sell to the plumbing industry their ability to target advertisements to people who visit plumping sites and these advertisements could be served to the people interested in plumbing on any site they visit and not necessarily a plumbing site. Dependent on the particular implementation, this may result in the insertion of a plumbing tag, and this (or another mechanism) may result in the modification of the profile of the person visiting that page. Other data which is obtained may also have value, such as data on search terms which are used or the way in which the search terms are used, and any data may be sold to generate additional revenue. In some examples, the price of any data sold may depend on the data which is provided. For example, detailed information (e.g. over 3000 categories) may be considerably more expensive than less detailed information (e.g. over 30 categories). The price of data may depend on the way in which the purchaser of the data plans (or is permitted) to use the data.

The system and method described above provides advantages to each element within the system 100 and to the owners/publishers of the web sites hosted by the host company 102. The system enables the host company 102 to offer many different targeted content providers to its hosted sites (e.g. to the publishers or site owners). This provides a service differentiator for the host company 102. The owners/publishers of the hosted sites, who are customers of the host company 102 (the hosted companies), are able to provide the most appropriate targeted content to the users who browse their sites, and therefore increase user satisfaction, as well as maximizing revenue from such content, in particular maximizing advertising revenue. The targeted content providers 105 are able to provide content which is specifically aimed at the user and/or the actual content of the page being viewed by the user. This maximizes the chance that an advertisement will be converted to a sale to the user or that content will be read and appreciated by the user.

Whilst in the system 100 shown in FIG. 1, there is a single host company 102, in other examples traffic between users and multiple host companies may be intercepted by the web marketing platform 101 (e.g. it may act as a proxy for more than one host company). In such a situation, the web marketing platform may combine data collated in relation to browsing of sites hosted by some or all of the host companies or may act as logically separate marketing platforms without sharing data.

Figure 9:
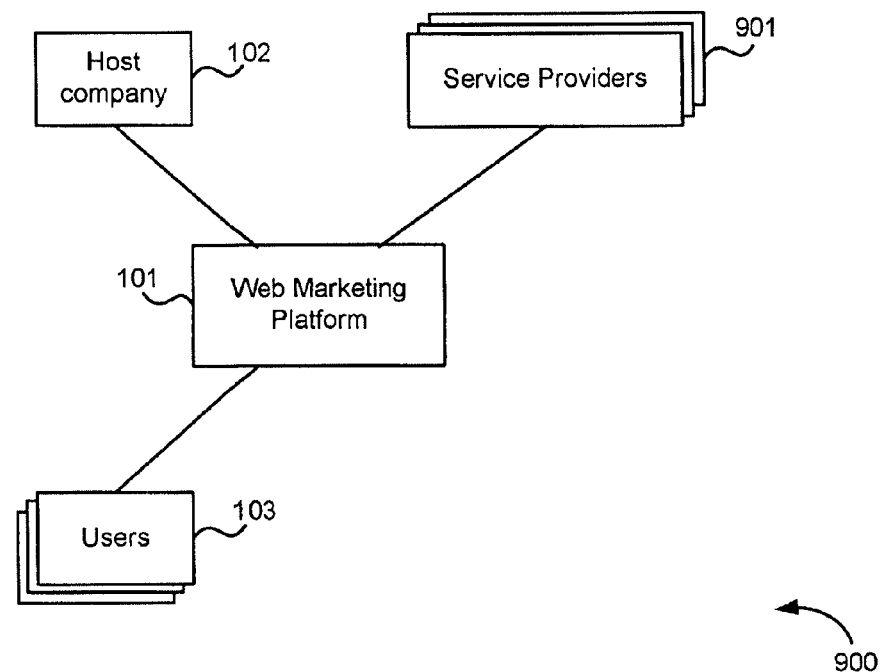
FIG. 9 is a schematic diagram of a system for providing a range of services.

The provision of dynamically targeted content is just one example of a service which may be provided by the web marketing platform 101. The system 100 described above may, in addition to or instead of providing dynamically targeted content, be used to provide other services to the hosted companies (which may be content publishers) or to other entities (e.g. companies hosted by other host companies), and further examples are described below. Any service may be provided by the web marketing platform 101 and examples include, but are not limited to:

web analytics
fraud detection
fraud prevention
page view time metrics
banner ad tracking
page download time analysis
form usage analysis
heat mapping
alerting
business intelligence FIG. 9 is a schematic diagram of a system 900 for providing a range of services (for example to customers of a host company), which is a variation of the system 100 shown in FIG. 1. The system comprises a web marketing platform 101, a host company 102, one or more users 103 and one or more service providers 901. The system of FIG. 9 shows only the logical connections between entities. It will be appreciated that the communication between elements may be over dedicated point to point links or over a network (such as the internet). As described above in relation to FIG. 1, there may be additional logical connections not shown in FIG. 9 and/or some of the logical connections shown in FIG. 9 may be omitted. Some different embodiments are described below by way of example only and without limitation on the actual arrangement of elements.

In the examples described above (e.g. with reference to FIGS. 1-8), the service providers may include one or more targeted content providers 105 and the system may further comprise a real time analysis tool 104. The service providers 901 may, in addition or instead, comprise providers of any of the services detailed above or any other service that may be of interest to an entity (not shown in FIG. 9) having a domain that is hosted by the host company 102, or any service which may be of interest to one of the users 103, the host company 102 or any other party.

Figure 10:
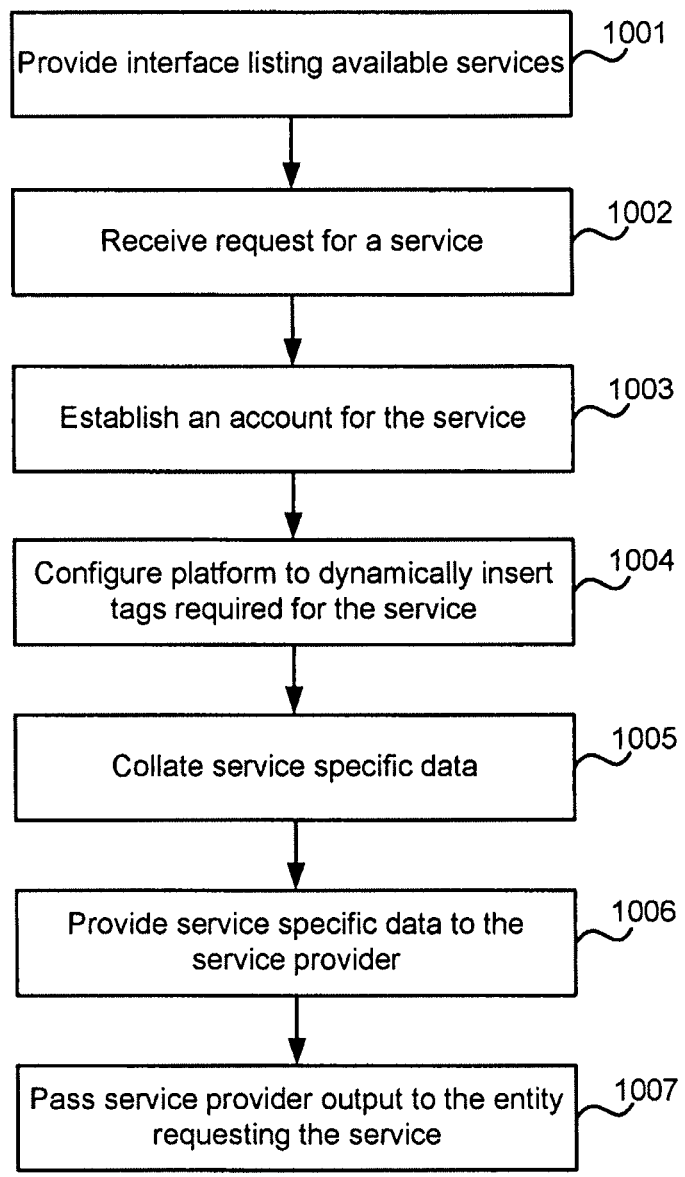
FIG. 10 shows a flow diagram of an example method of operation of the system shown in FIG. 9.
Figure 11:
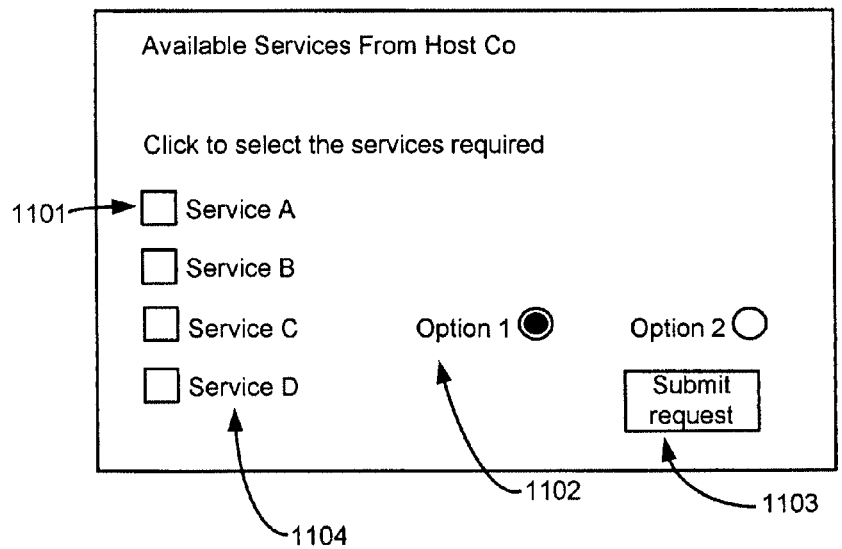
FIG. 11 shows an example graphical user interface.

FIG. 10 shows a flow diagram of an example method of operation of the system 900 shown in FIG. 9. As described above, the web marketing platform 101 may act as a proxy for the host company 102 and intercept some or all the traffic between users 103 and the host company 102. Alternatively traffic may be redirected to the web marketing platform using any other technique (e.g. internal redirecting or DNS reroute). The web marketing platform 101 provides an interface which details the services available (block 1001). Different services may be available to different entities within the network, dependent on one or more parameters such as the entity type (e.g. publisher/user/host/third party etc) and the entity's service level (e.g. with the host company, with the operator of the web marketing platform or with the provider of the web marketing platform). The interface may be provided as a web page or graphical user interface such as the one shown in FIG. 11, which includes a click box 1101 for each service that is available. In addition, the interface may include options 1102 in relation to some of the services and a button 1103 to submit the service request. Using such an interface, an entity can request one or more services in just a few mouse clicks. Alternatively, the interface may enable a service to be requested in a single click (e.g. by clicking the appropriate box 1101 or clicking on the service name 1104).

In some examples, the service providers may specify the characteristics of the entities to which they are prepared to provide services. For example, a provider of web analytics may agree to offer their services to any publisher with ten or more web pages. In another example, a service provider may only offer services to users or to the host company itself.

Having provided the interface (in block 1001), the web marketing platform may receive a request for a service (block 1002). This may be as a result of the 'submit request' button 1103 being clicked or other request mechanism. In another example, the request may be received verbally (e.g. by telephone) or in writing (e.g. by email or fax) and the request entered into the system automatically or by a representative of the operator or provider of the web marketing platform (e.g. an employee of the operator or provider or the host company). In some examples there may be third party resellers of the services who have access to the interface and sign up their clients. These third party resellers may actively promote the services to potential clients. An example of a third party reseller may be a search engine marketing company.

On receipt of the request (in block 1002), an account for the requested service is established automatically (block 1003) and this may be achieved using a custom API. In another example, the account for the requested service may be established manually.

The web marketing platform 101 and/or the real time analysis tool 104 may be configured to dynamically insert any tags which are required for the operation of the service (block 1004) into any web pages, requests or other content. This configuration of the web marketing platform 101 and/or the real time analysis tool 104 may be performed automatically or manually. The location of the tags and the tags required will depend on the entity requesting the service (e.g. publisher/user/host/third party etc) and the actual service requested. Methods of automatic tag insertion are described in more detail below. In other examples, other tracking methods may be used instead of automatically inserting tags. One suitable method is described in U.S. Pat. No. 6,763,383.

Depending on the nature of the requested service, it may be necessary to perform additional steps following the configuration of the system to dynamically insert tags (in block 1004) and a number of examples of additional steps are described below (blocks 1005-1007). A system may be operated using all the steps described, none of those steps or any subset of the steps.

Depending on the nature of the requested service, it may be necessary to collate service specific data (block 1005), which may be achieved using the automatically inserted tags or using any other means. The service specific data may then be sent to the service provider (block 1006). Methods of collating the service specific data are described in more detail below. In other examples, it may not be necessary for the web marketing platform to collate service specific data (block 1005) as this may be collated by the service provider as a result of the tags which have been inserted (in block 1004).

Also depending on the nature of the requested service, there may be output from the service provider that needs to be sent to the entity which requested the service. This may be sent directly from the service provider to the entity without passing through the web marketing platform or alternatively, the web marketing platform may pass the output from the service provider to the entity that requested the service (block 1007). In other examples, it may not be necessary to pass output from the service provider to the requesting entity (as in block 1007) because the requesting entity may be able to access the output directly, for example by logging into the service provider's system to view the results (e.g. where the service is Google Analytics).

One of the services offered to entities (for example to hosted companies) may be the inclusion of targeted content, such as targeted advertising, within their sites. In such an example, various options may be provided which relate to the advertising networks which are used or the type of advertisements inserted e.g. blind advertisements or behaviorally targeted advertisements (which may attract different revenue sharing schemes as described below).

The web marketing platform 101 may be operated by any entity, for example:
- the host company 102
- the web marketing platform provider (e.g. Clickstream Technologies PLC) or
- another entity (e.g. one which is not a host company or one which is a different host company to host company 102).

Figure 12:
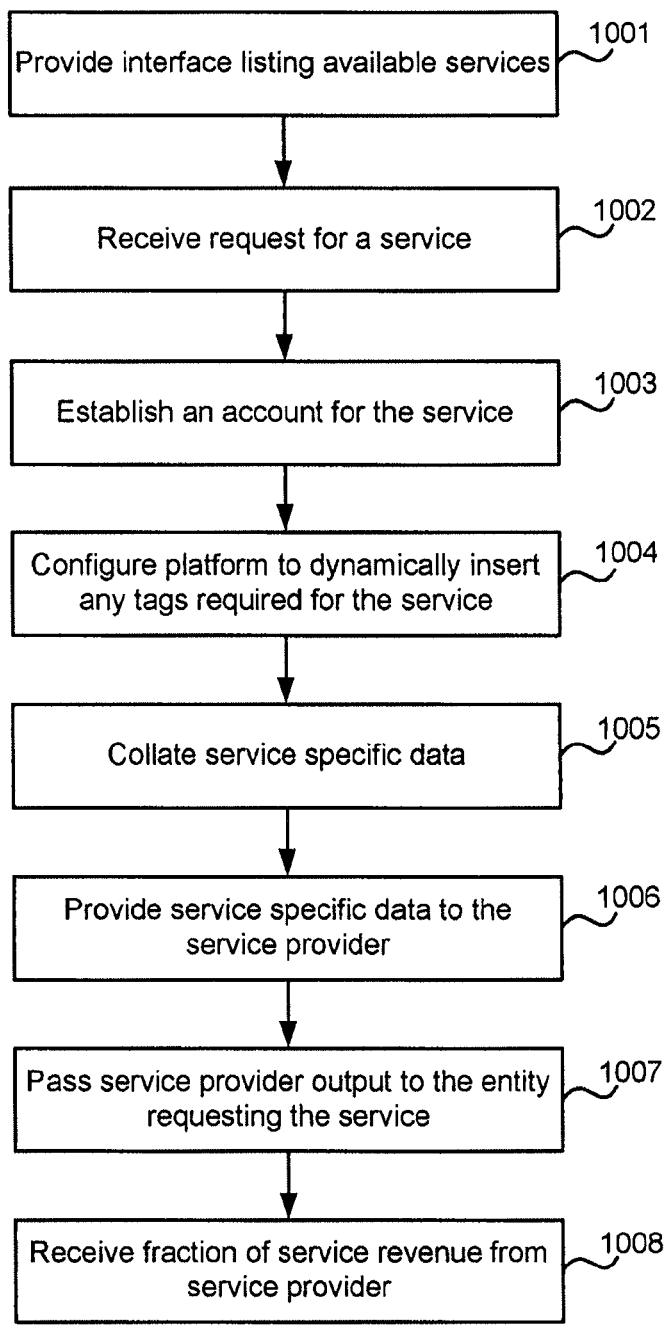
FIG. 12 shows a second flow diagram of an example method of operation of the system shown in FIG. 9.

As a result, the web marketing platform provider may be different to, or the same as, the web marketing platform operator. Either or both the web marketing platform operator and web marketing platform provider may generate income through a revenue sharing agreement with one or more of the service providers. In each case, the entity with the revenue sharing agreement (e.g. the web marketing platform operator and/or the web marketing platform provider) may receive a fraction of the service revenue, as shown in FIG. 12 (block 1008). As described above, elements of the method shown in FIG. 12 may be omitted without losing the effect sought (e.g. any one or more of blocks 1005-1007 may be omitted). There are many other revenue generation schemes which may be implemented and a number of other schemes are described below. Any of the schemes described herein may be used independently or in combination with any aspects of any other schemes.

The clients of the web marketing platform operator may be the owners/publishers of web sites hosted at the same location and/or the owners/publishers of web sites hosted at third party locations. Where the server on which a web site is stored and the web marketing platform are at different physical locations, this may be referred to as the 'virtual model'. These different physical locations may be geographically separated. The web marketing platform and the server on which the hosted site is stored may be operated by the same entity (e.g. a host company) or may be run by different entities.

Where the web marketing platform 101 is not operated by the host company 102, the operator of the web marketing platform may have a contractual relationship with the host company such that some or all of the traffic passes through the web marketing platform. In addition, or instead, the operator of the web marketing platform may have a relationship with any other entity in the network such that traffic to/from that entity passes through (or is copied to) the web marketing platform in order that services can be provided. Any suitable traffic redirection or forwarding mechanism may be used. By this means the web marketing platform operator may have relationships with customers of many host companies and the methods described may be used to provide services to owners/publishers of web sites hosted by any host company.

Where services are provided to hosted companies by or on behalf of their host company, this may provide a service differentiator for the host company 102 and therefore the web marketing platform operator and/or the web marketing platform provider may (in addition, or instead) obtain a revenue sharing agreement with the host company (e.g. $10 for each publisher selecting a service). This may be particularly beneficial where the services provided are free of charge (e.g. Google Analytics) but the fact that the tags are inserted automatically, therefore eliminating an otherwise labor intensive (and potentially error-prone) task, provides considerable benefit to the publisher. The host company may be able to charge the hosted companies for this service and provide a fraction of this revenue to the web marketing platform operator and/or the provider of the web marketing platform.

Where the service provided is targeted advertising, the revenue sharing agreements may be complex. The web marketing platform operator or the web marketing platform provider may have a first agreement with the host company (or with one or more hosted companies) to obtain a share of the advertising revenue which is generated (as in block 306). The web marketing platform operator or the web marketing platform provider may also have a second agreement with the advertising network (as in block 1008) to obtain a share of any sales revenue which results from the advertising or to obtain a further share of the advertising revenue. In other applications, the web marketing platform operator and/or the web marketing platform provider may have many revenue sharing agreements depending upon the service provided and the entity to which the service is provided.

The method described above in relation to FIGS. 10-12 enables a marketing representative within a publisher to obtain detailed statistics on how users access and navigate their web site without requiring any involvement from their IT department. Additionally, as the account is set up automatically and tags inserted automatically (where required), the entity that requests the service does not require any IT support. The automation also enables individuals and small companies to obtain services which otherwise might be prohibitive in terms of administrative burden, set up effort and IT support requirements. The automation is also beneficial for large companies that may have large numbers of web pages, as the administrative burden of manual tagging of all their pages may be prohibitive. The automation is also beneficial for the host company because the burden of implementation is very low.

Additionally, as the services are provided in a flexible manner, to a large number of potential customers (e.g. to customers of the host company), it may be possible to offer services in a different manner to clients, e.g. by charging on a report by report basis or by providing short term access to services. This may enable a different charging policy such that upfront fees are not required, which may attract smaller customers who would otherwise be unable to afford the set up costs.

By opening the access of the services to new and different types of customers, there is significant benefit to the service providers. This may be used to justify any revenue sharing agreement between a service provider and the web marketing platform operator or the web marketing platform provider.

Figure 13:
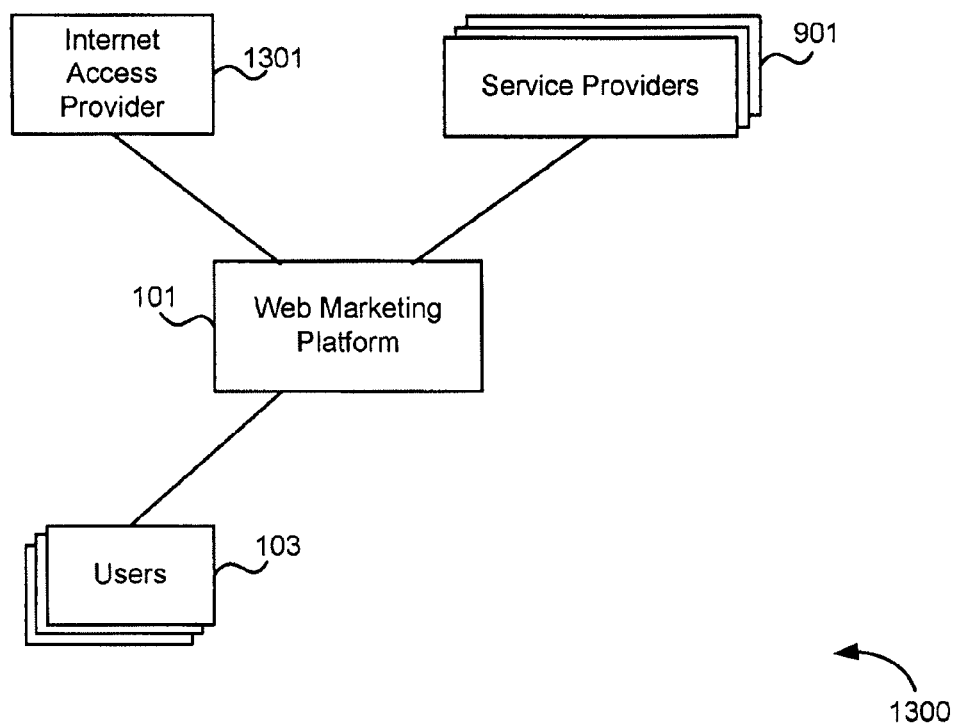
FIG. 13 is a schematic diagram of a system for providing a range of services to users.

Whilst in the above description, the web marketing platform 101 is associated with the host company (and may be in the same or a different location), in some examples the web marketing platform 101 may alternatively be associated with an internet access provider 1301 as shown in the system 1300 of FIG. 13. The system of FIG. 13 shows only the logical connections between entities. It will be appreciated that the communication between elements may be over dedicated point to point links or over a network (such as the internet). As described above in relation to FIGS. 1 and 9, there may be additional logical connections not shown in FIG. 13 and/or some of the logical connections shown in FIG. 13 may be omitted.

The internet access provider 1301 may ensure that some or all of its traffic to and from users 103 passes through the web marketing platform 101. In such a system 1300 the service providers 901 may provide services to the users 103 (or any other entities). The services provided by the service providers 901 to the users may be different to those provided to the customers of the host company 102 in the system 900 of FIG. 9. Any service may be provided and possible examples include, but are not limited to:
  satisfaction surveys
  widgets (e.g. browser side widgets)
  virtual toolbars
  navigation/problem solving advice e.g. when a user receives a 'file not found' error in response to a request (also known as a 404 error), suggestions of alternative urls to consider may be provided.

In yet further examples, the web marketing platform 101 may be associated with any other entity within a network or may operate independently. Dependent on the location of the web marketing platform, the customers for the services may be the same or different (e.g. site owners, users, host companies etc) and the services offered may be the same or different.

The following paragraphs describe techniques which may be used in the implementation in any of the methods described above. Any implementation may use none, one or more of the techniques described below and aspects of the techniques may be combined in any manner to achieve the desired result.

As described above in relation to FIG. 1, the web marketing platform 101 and the real time analysis tool 104 may be co-located (e.g. in the same server farm) or may be geographically separated. FIGS. 14-23 show techniques which may be used to ensure that communication between the two entities is sufficiently fast even when the two entities are geographically separate.

Figure 14:
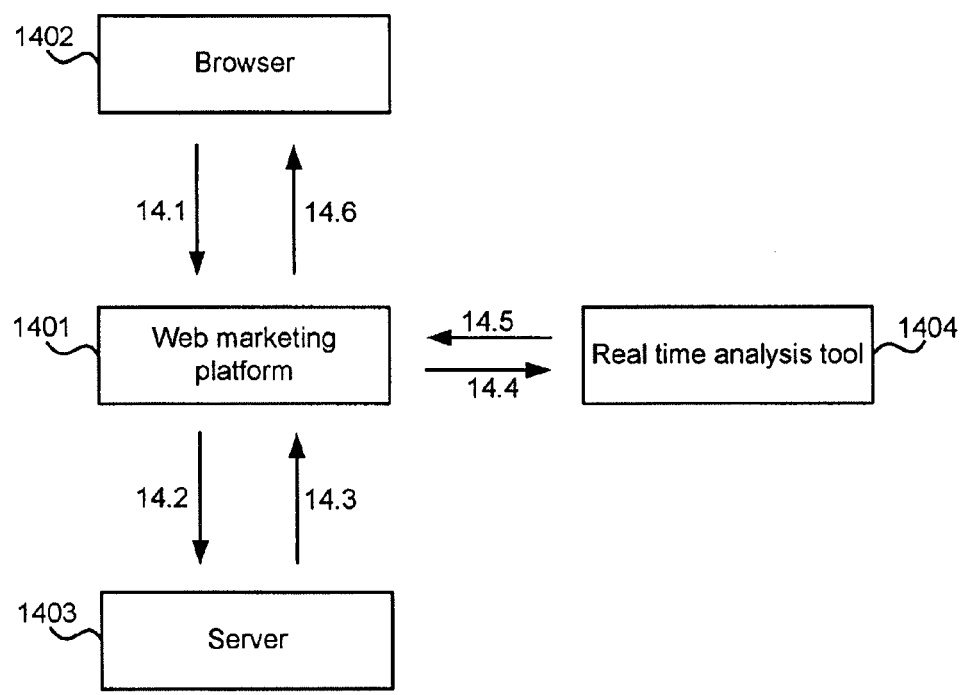
FIGS. 14-16 show example message flows in a system.

FIG. 14 shows a first message flow between elements in a system comprising a web marketing platform 1401, which acts as a proxy between a browser 1402 or other application, used by a user to access content, and a server 1403, which provides the requested content. The term 'requested content' is used to refer to the content which is provided by the server in response to the request. The term 'modified content' is used to refer to the combination of the requested content and the inserted targeted content. The server 1403 may be provided by a host company. Real time analysis is performed by a real time analysis tool 1404. The message flow is indicated by numbered arrows in FIG. 14 (and a similar approach is used in FIGS. 15, 16 and 18-23 described below).

A request for content (arrow 14.1) is sent by the browser 1402 and received at the web marketing platform 1401 (as in block 301 of FIG. 3). This request is forwarded on to the server 1403 (arrow 14.2), which returns the content to the web marketing platform (arrow 14.3). The requested content and/or the request is then sent to the real time analysis tool 1404 (arrow 14.4) for analysis (as in block 302 of FIG. 3) and the analysis results are returned to the web marketing platform (arrow 14.5). These results are used to identify targeted content for insertion into the requested content (as in block 303) and the modified web page (comprising the requested web page, with the inserted targeted content), is sent to the browser (arrow 14.6 and as in block 305).

The message flow shown in FIG. 14 may be used when the targeting is based on aspects relating to the user, the request, the content or any other criteria. However, where the targeting is not based on the content, but on aspects relating to the request or the user (or other non-content criteria), the message flow can occur in a different order, as shown in FIG. 15.

Figure 15:
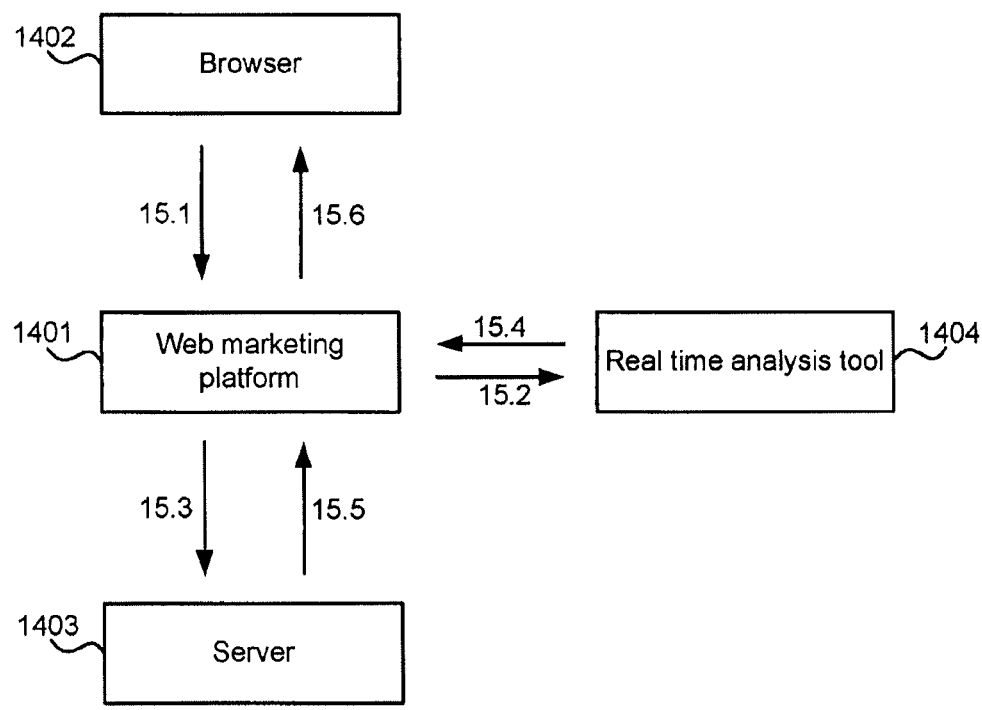

FIG. 15 shows a second message flow between elements in a system comprising a web marketing platform 1401, a browser 1402 (or other application), a server 1403 and a real time analysis tool 1404. As in FIG. 14, a request is sent from the browser and received at the web marketing platform (arrow 15.1). At this stage, the web marketing platform may forward details of the user and/or the request to the real time analysis tool (arrow 15.2). The request is also forwarded on to the server (arrow 15.3). Depending on the implementation, this may occur at the same time or before/after the details are forwarded to the real time analysis tool, i.e. arrows 15.2 and 15.3 may occur substantially at the same time or arrow 15.2 may precede arrow 15.3 or arrow 15.2 may occur after arrow 15.3. The real time analysis tool provides the analysis results to the web marketing platform (arrow 15.4) and the server returns the requested content to the web marketing platform (arrow 15.5). These two messages may occur substantially concurrently or in any order. On receipt of the results, the web marketing platform can identify targeted content for insertion (as in block 303 of FIG. 3) and on receipt of the requested content, the web marketing platform can insert the targeted content (as in block 304 of FIG. 3) and send the modified content to the browser (arrow 15.6 and as in block 305).

In the message flow of FIG. 15, the data is provided to the real time analysis tool at an earlier stage than in the message flow of FIG. 14. This may provide the real time analysis tool additional time to perform the analysis and/or accommodate any latency in the network connection between the web marketing platform and the real time analysis tool. Furthermore, if the web marketing platform receives the analysis results from the real time analysis tool (as in arrow 15.4) before it receives the requested content (in arrow 15.5), the web marketing platform has additional time to select the targeted content for insertion. This may be beneficial where real time bidding is used to identify the targeted content (as described in more detail above).

Figure 16:
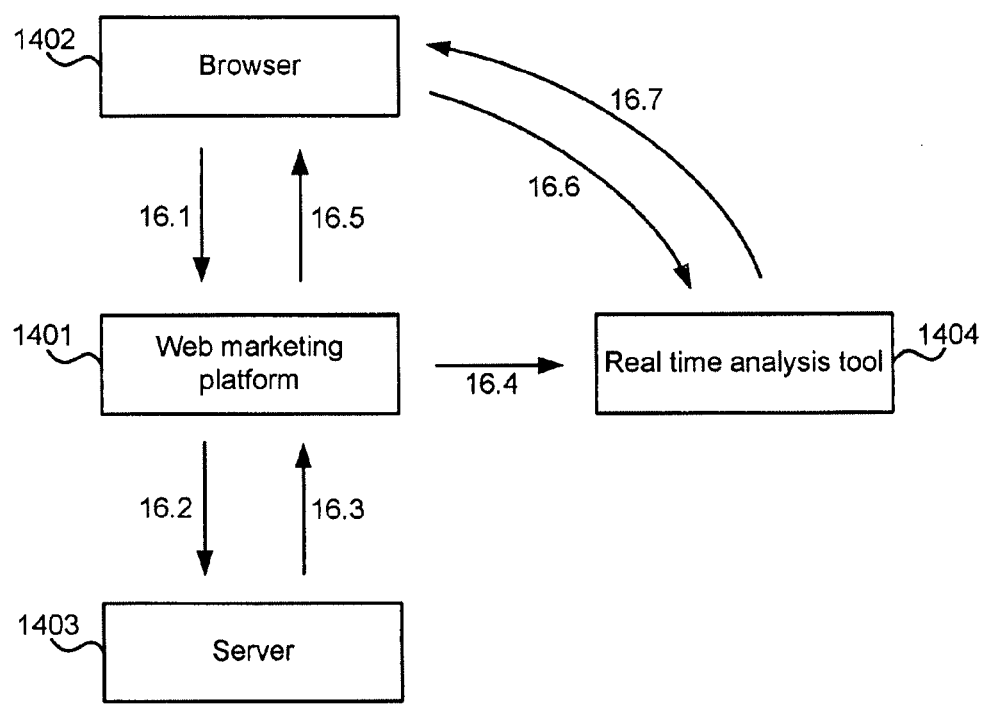
Figure 17:
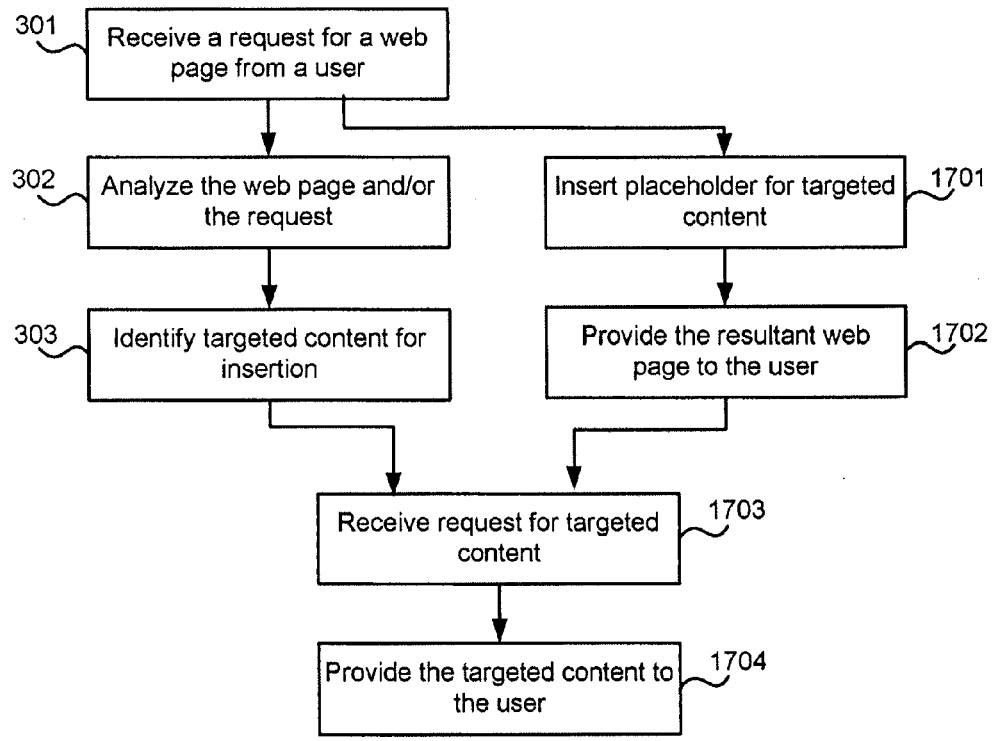
FIG. 17 shows a flow diagram of an example method of operation of the system.

FIG. 16 shows a third message flow, which may be used when the targeting is based on aspects relating to the user, the request, the content or any other criteria. This is also described with reference to FIG. 17, which shows an example flow diagram, which is a variant of that shown in FIG. 3 (described above). The request is sent from the browser, received by the web marketing platform (arrow 16.1 and block 301) and forwarded to the server (arrow 16.2). The server returns the requested content (arrow 16.3) and this is sent to the real time analysis tool (arrow 16.4) for analysis (in block 302). Whilst the analysis is performed, a placeholder for the targeted content is inserted within the requested content (block 1701) and the resultant content (including the placeholder) is sent to the browser (arrow 16.5 and block 1702). The placeholder may include an instruction to call the real time analysis tool and request the targeted content. A request is then received by the real time analysis tool requesting the targeted content (arrow 16.6 and block 1703). In response, the targeted content is provided to the browser (arrow 16.7 and block 1704). The insertion of the targeted content into the requested content may then be performed by the browser.

In an example, the placeholder inserted within the requested content (block 1701) may comprise instructions to contact the real time analysis tool and request a tag. The placeholder may alternatively comprise instructions to contact the real time analysis tool for details of a category (e.g. a content category such as 'plumbing') and then to insert a tag corresponding to that category (e.g. a behavioral tag which increments the value of 'plumbing' associated with the user).

As described above, the targeted content (requested in block 1703 as a result of instructions in the placeholder and sent to the browser in block 1704, arrow 16.7) may comprise a tag for content provided by one of the targeted content providers 105. On receipt of this tag, the browser may fetch the content from the targeted content provider. In another example, the targeted content may comprise a cookie.

Figure 18:
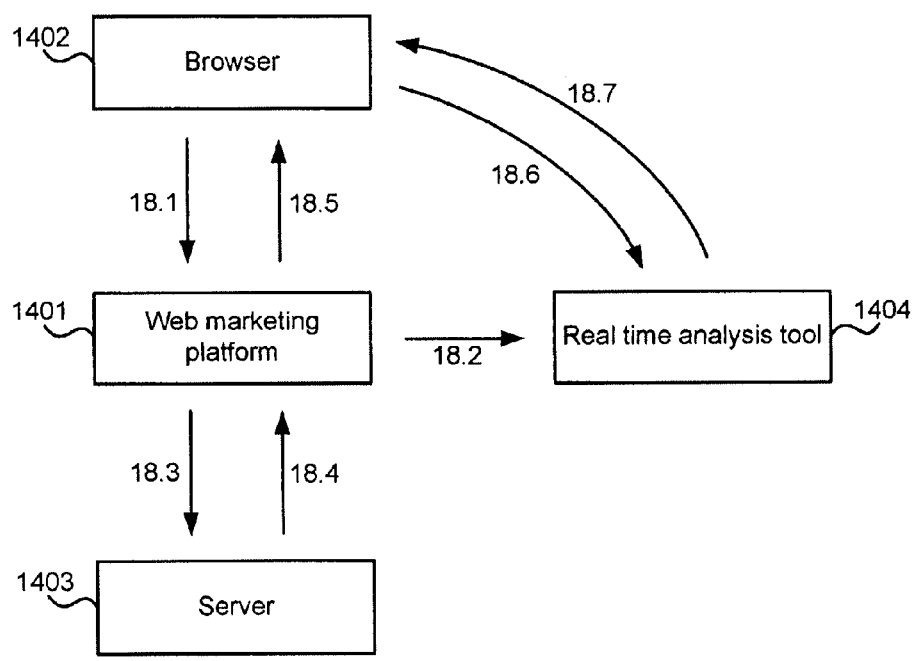
FIGS. 18-23 show further example message flows.

FIG. 18 shows a fourth message flow, which is a variation of that shown in FIG. 16, but is suitable for use where the targeting is not based on the content, but on aspects relating to the request or the user (or other non-content criteria). This message flow may also correspond to the method shown in the flow diagram of FIG. 17. The request is sent from the browser and received by the web marketing platform (arrow 18.1). At this point, details of the request and/or the user are forwarded to the real time analysis tool (arrow 18.2). At the same time or at an earlier/later time, the request for content is forwarded to the server (arrow 18.3). The server returns the requested content (arrow 18.4) and the resultant content, including a placeholder for the targeted content, is sent to the browser (arrow 18.5). As described above, the placeholder may include an instruction to call the real time analysis tool and request the targeted content. A request is then received by the real time analysis tool requesting the targeted content (arrow 18.6) and the targeted content, is provided to the browser (arrow 18.7).

The message flows shown in FIGS. 16 and 18 provide the real time analysis tool 1404 with additional, time to perform the analysis compared to the message flows shown in FIGS. 14 and 15. In further examples, these methods may be used in combination. For example, the message flow of FIG. 14 may be used unless the real time analysis tool 1404 indicates to the web marketing platform 1401 that additional time is required, in which case the message flow of FIG. 16 may be used. In a further example, where the targeting is non-content based, the message flow of FIG. 15 may be used unless the real time analysis tool 1404 indicates to the web marketing platform 1401 that additional time is required, in which case the message flow of FIG. 18 may be used. In yet further examples, the message flows may be combined in any other way.

Figure 19:
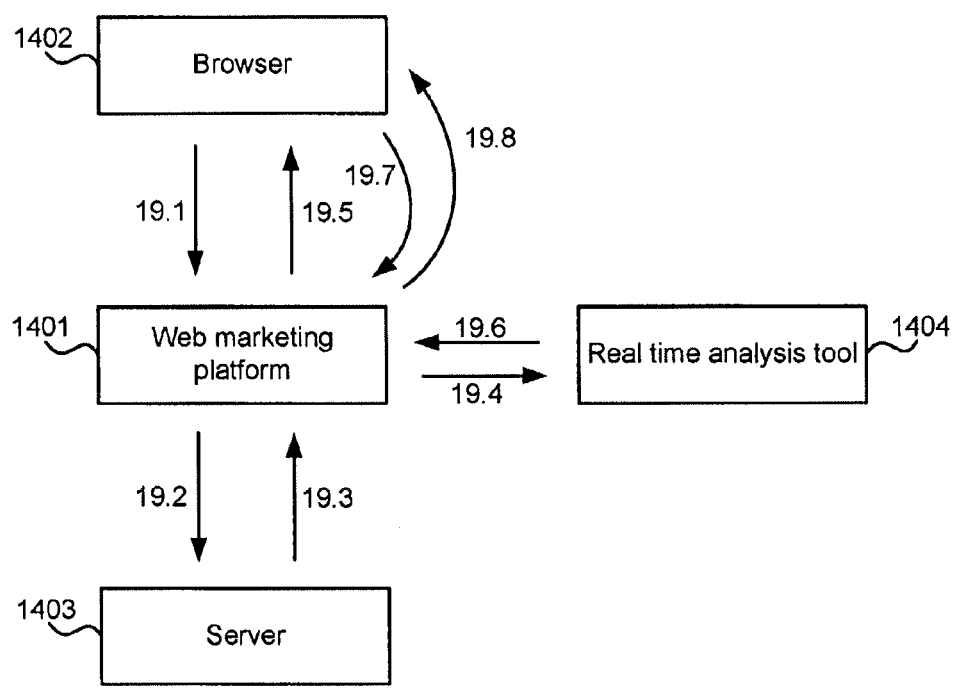

FIG. 19 shows a fifth message flow, which is a variation of that shown in FIG. 16. The message flow shown in FIG. 18 may be modified in a similar manner to create a further example message flow. The request is sent from the browser, received by the web marketing platform (arrow 19.1) and forwarded to the server (arrow 19.2). The server returns the requested content (arrow 19.3) and this is sent to the real time analysis tool for analysis (arrow 19.4). Whilst the analysis is performed, a placeholder for the targeted content is inserted within the requested content and the resultant content (including the placeholder) is sent to the browser (arrow 19.5). In this example, the placeholder may include an instruction to call the web marketing platform 1401, rather than the real time analysis tool 1404 in order to request the targeted content. On completion of the analysis, the real time analysis tool returns the output of the analysis (the targeting data) to the web marketing platform (arrow 19.6). As a result of the placeholder, a request for the targeted content is sent by the browser to the web marketing platform (arrow 19.7). In response, the targeted content is provided to the browser (arrow 19.8). Alternatively, the targeted content may be inserted into the requested content (as in block 304 of FIG. 3) and the modified content provided to the user (as in block 305 of FIG. 3). As described above, the targeted content provided to the browser (in arrow 19.7) may, in some embodiments, comprise a tag or a cookie.

Figure 20:
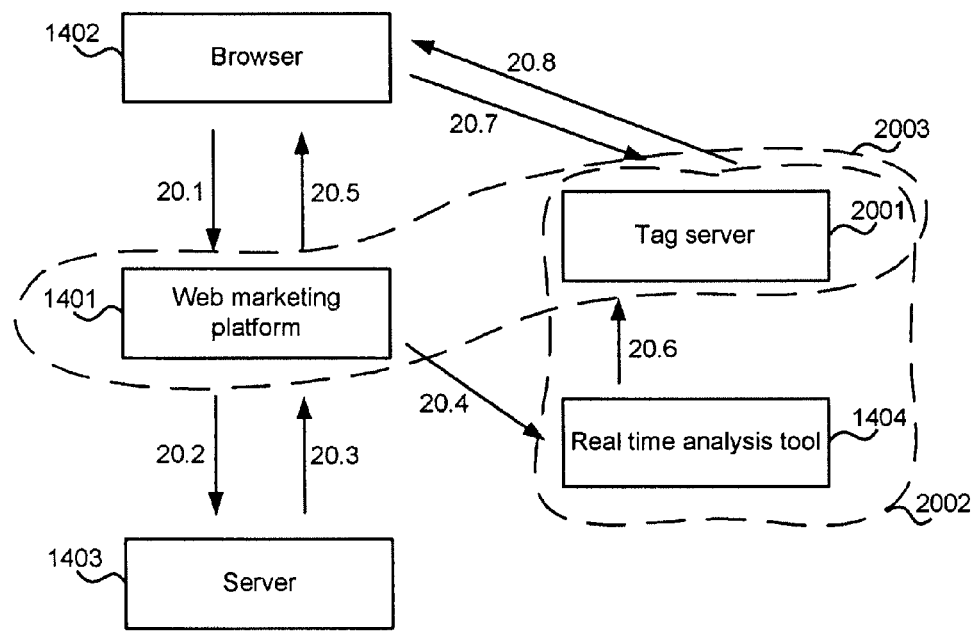

The difference between the message flows shown in FIGS. 16 and 19 is the entity which provides the targeted content to the browser. In FIG. 16 this is provided by the real time analysis tool 1404 whilst in FIG. 19 this is provided by the web marketing platform 1401. In a further example, where the targeted content is a tag, the targeted content may be provided by another entity, referred to as a tag server 2001, as shown in FIG. 20.

In a corresponding manner to the message flows described above, the request is sent from the browser, received by the web marketing platform (arrow 20.1) and forwarded to the server (arrow 20.2). The server returns the requested content (arrow 20.3) and this is sent to the real time analysis tool for analysis (arrow 20.4). Whilst the analysis is performed, a placeholder for the targeted content is inserted within the requested content and the resultant content (including the placeholder) is sent to the browser (arrow 20.5). In this example, the placeholder may include an instruction to call the tag server 2001. On completion of the analysis, the real time analysis tool returns the output of the analysis (the targeting data) to the tag server (arrow 20.6). As a result of the placeholder, a request for the targeted content is sent by the browser to the tag server (arrow 20.7). In response, the targeted content is provided to the browser (arrow 20.8).

The tag server 2001 may be a separate entity from both the web marketing platform 1401 and the real time analysis tool 1404. However, if the tag server is considered part of the real time analysis tool (as indicated by dotted line 2002), the message flow of FIG. 20 is the same as that shown in FIG. 16, whilst if the tag server is considered part of the web marketing platform, the message flow of FIG. 20 is the same as that shown in FIG. 19. The same arguments may alternatively be applied to the message flow of FIG. 18 or others of the message flows described herein.

Figure 21:
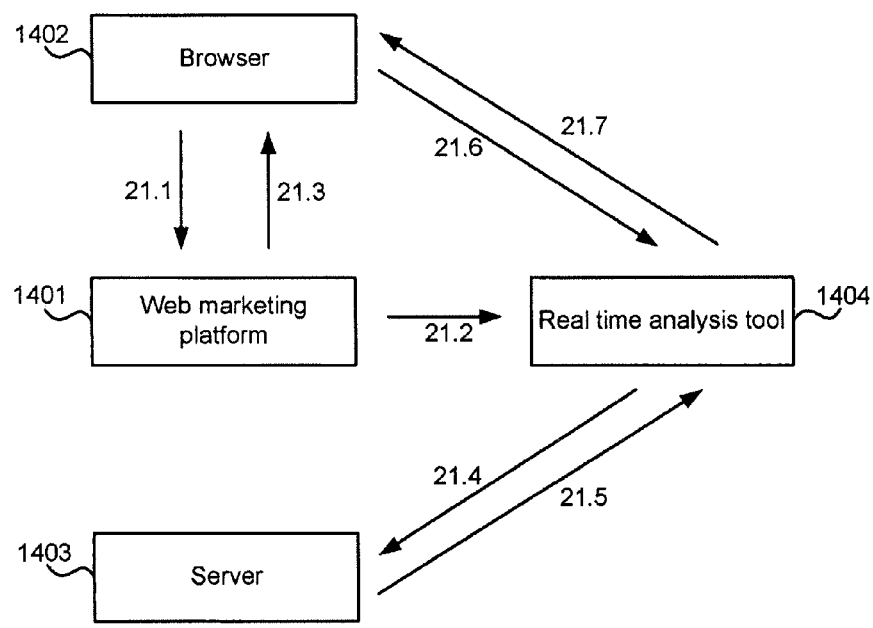

FIG. 21 shows a seventh message flow, which is a variation of that shown in FIG. 18. The request is sent from the browser and received by the web marketing platform (arrow 21.1). Details of the request are forwarded to the real time analysis tool (arrow 21.2). Details relating to the user may also be forwarded with the request. A placeholder web page is returned to the browser (arrow 21.3) which may include an instruction to call the real time analysis tool and request the targeted content. The request for content is forwarded to the server by the real time analysis tool (arrow 21.4), and this may occur before, after or substantially at the same time as the provision of the placeholder web page by the web marketing platform (in arrow 21.3). The server returns the requested content to the real time analysis tool (arrow 21.5). On completion of the analysis, the real time analysis tool inserts the targeted content into the requested content and on receipt of a request from the browser (arrow 21.6), the real time analysis tool provides the modified content to the browser (arrow 21.7).

Figure 22:
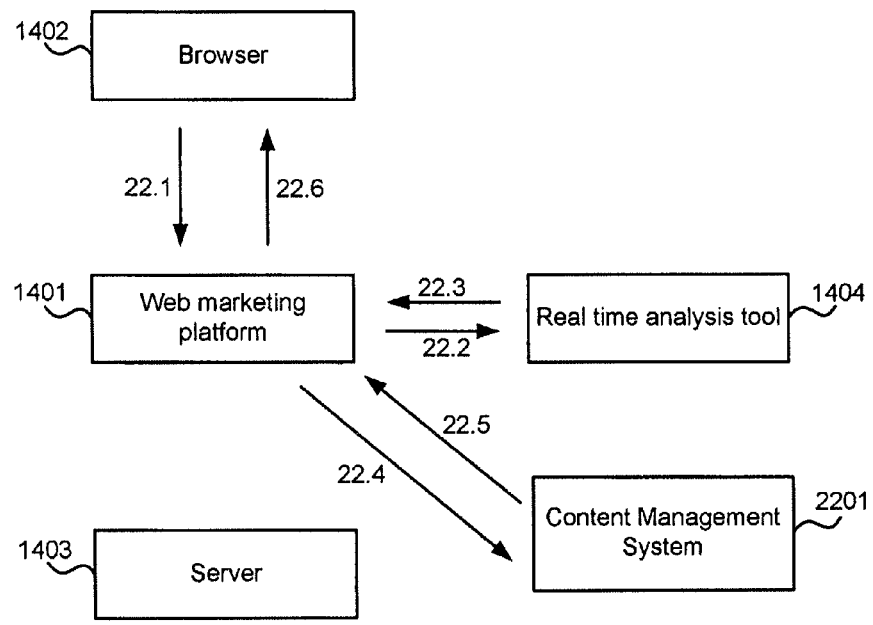

FIG. 22 shows an eighth message flow. This message flow is a modification of that shown in FIG. 15 and other message flows described above may be modified in a corresponding manner. A request for content (arrow 22.1) is sent by the browser 1402 and received at the web marketing platform 1401. At this stage, the web marketing platform may forward details of the user and/or the request to the real time analysis tool (arrow 22.2). The real time analysis tool provides the analysis results to the web marketing platform (arrow 22.3) and these results are forwarded on to a content management system (CMS) 2201 (arrow 22.4). Details of the request and/or the user may be provided to the CMS in addition to the analysis results. The CMS generates content based on the information provided by the web marketing platform (in arrow 22.4) and returns the generated content to the web marketing platform (arrow 22.5). The web marketing platform then forwards this content to the browser (arrow 22.6). Alternatively, the CMS may return the generated content to the browser directly.

In an example, the server 1403 and CMS 2201 may comprise a single entity. In a further example, the server 1403 may not be required. In another example, the CMS 2201 and the web marketing platform 1401 may comprise a single entity.

The message flow shown in FIG. 22 may be particularly beneficial for an entity which owns (or hosts) many domains for which there are no web sites. For example, a company or organization may purchase domains which are misspellings of common words, such as nouns. Based on the information provided to it, the CMS generates appropriate content for delivery. This content may be generated from sets of content units associated with particular keywords or search terms (e.g. based on the noun which has been spelt incorrectly in the domain name) and also may include multiple sets of content units each associated with different categories. For example, a request to a domain including the word 'table' or 'tabel' may result in sets of content units in categories such as 'table (furniture)' and 'table (spreadsheet)'.

Figure 23:
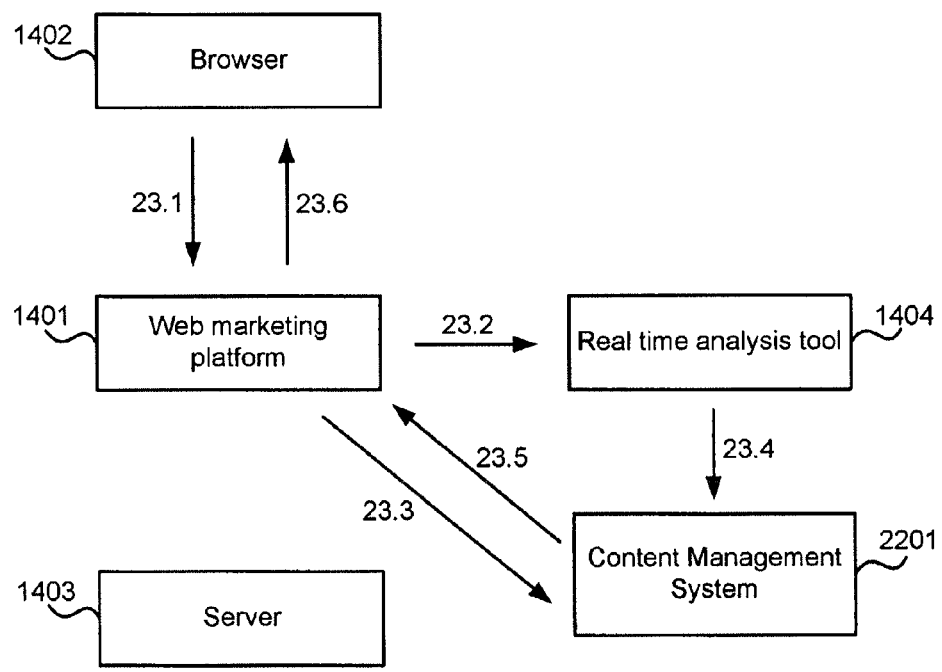

In a further example, shown in FIG. 23, the real time analysis tool may provide the analysis results to the CMS directly. As in FIG. 22, request for content (arrow 23.1) is sent by the browser 1402 and received at the web marketing platform 1401. The web marketing platform forwards details of the user and/or the request to the real time analysis tool (arrow 23.2) and the request is also forwarded on to the CMS (arrow 23.3). In this example, the real time analysis tool provides the analysis results to the CMS directly (arrow 23.4) and the CMS generates content based on the request (and/or the user) and/or the output from the analysis. The CMS then returns the generated content to the browser either via the web marketing platform (arrows 23.5 and 23.6) or directly.

In a further variation to that shown in FIG. 23, the request may not be forwarded to the CMS by the web marketing platform (arrow 23.3 is omitted) and instead the request information may be forwarded by the real time analysis tool along with the results of the analysis (in arrow 23.4).

In a further variation to the message flows shown in FIGS. 22 and 23, the CMS may generate content based on the information provided by the web marketing platform and the web marketing platform may insert further content (e.g. targeted content) into the content generated by the CMS. The information provided by the web marketing platform may comprise any of the following: details of the user, details of the request and the analysis results.

A large number of different variations of message flow have been described above with reference to FIGS. 14-23. In some of the variations it may be beneficial to use identifiers so that the request, the corresponding information provided by the real time analysis tool and the corresponding page provided by the server can be identified. Aspects of any of these message flows may be combined in any manner to arrive at further message flow examples.

Whilst the message flows of FIGS. 14-16 and 18-23 show single-ended arrows, these are not intended to limit the message flow at any stage to unidirectional traffic. At some or all of the stages, the passing of messages may include, or require, bidirectional traffic, for example, for the purposes of handshaking, authentication or acknowledgements.

Figure 24:
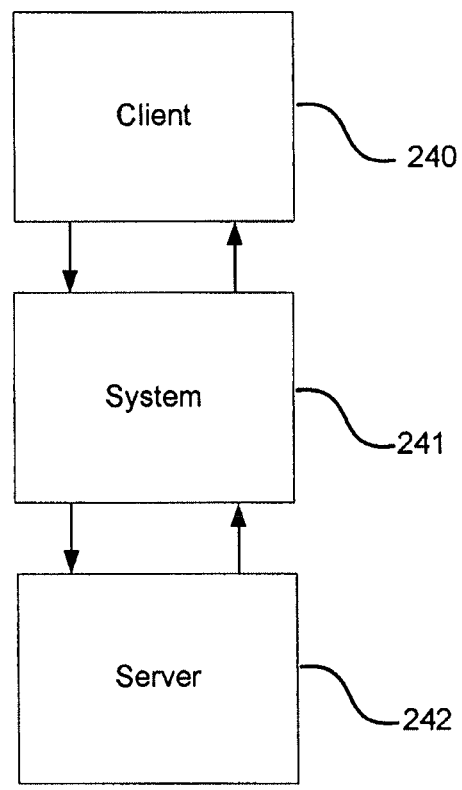
FIG. 24 is a schematic diagram of a system according to the current invention.

FIG. 24 shows a schematic diagram of a system for implementing methods of the current invention. Client 240 is a user's computer which is utilised to request and display content from servers. Server 241 has a particular network address and contains content that is served to clients in response to requests from those clients 240 to that network address. System 242 is a tagging system connected to the network. The network is configured such that requests to server 241, and responses from, server 241 are directed to the tagging system. For example, the DNS records of the domains for which requests and responses will pass through the tagging system may be updated such that those requests and responses are routed via the tagging system.

Figure 25:
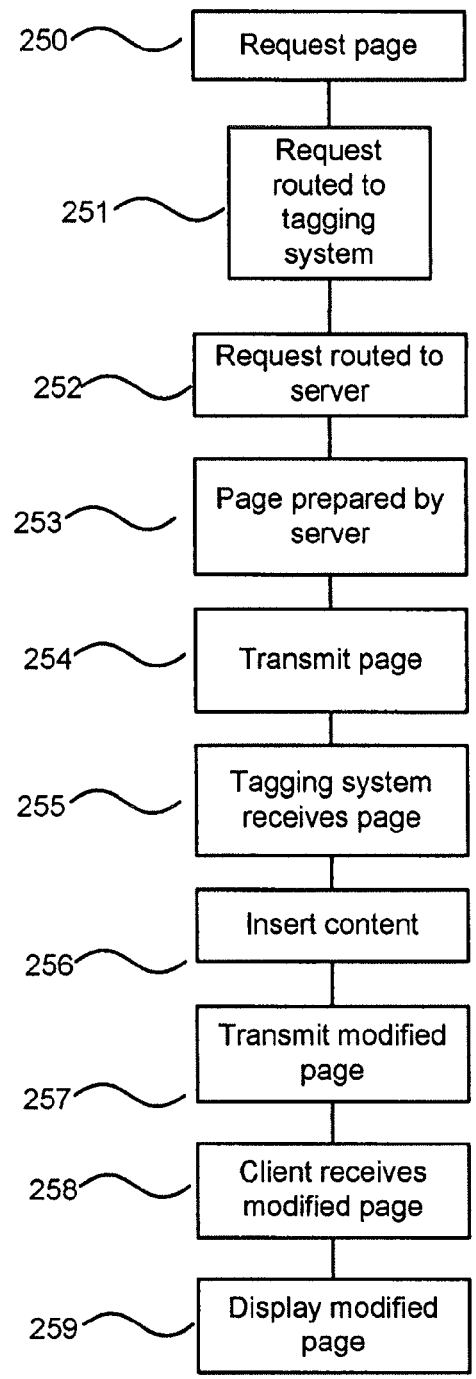
FIG. 25 is a flow-chart of a method of inserted tags according to the current invention.

The system of FIG. 24 allows the dynamic modification of content served by server 241 to client 240 without the need to modify the stored content. FIG. 25 shows a flow-chart of a process for automatically inserting content into pages transmitted by server 241 to client 240. Client 240 requests (block 250) a page from server 241 and that request is routed (block 251) to the tagging system and then on to the server having the correct address for that page (block 252). The requested page is then prepared by the server (block 253). Preparation of the page may involve fetching the required content from a storage system and transmitting it, or if a content management system is utilised, content may be fetched and compiled with the required template before being transmitted. The page is then transmitted (block 254) by the server.

As explained above, the network is configured such that the tagging system 242 receives (block 255) pages transmitted by server 242 on their route to the client 240. The tagging system 242 inserts (block 256) the requisite content into the page received, as defined by the configuration of the tagging system, and the modified page is transmitted to the client (block 257). The modified page is received by the client (block 258) and displayed (block 259) according to the information in the page.

The content added to the page by the tagging system is acted upon by the client, thereby allowing displayed content, formatting information or instructions to be sent to the client by the tagging system. For example, the content inserted may be tags that cause the client to fetch an advertisement from an advertisement supplier. Alternatively a tag may have been inserted to track a user's behaviour in relation to the page served.

Such a system provides control over the number of times content is inserted in each requested content. For example, it may be required that a particular piece of content is only inserted once in the requested content, or alternatively a piece of content may be required to be inserted in each piece of requested content. Since tagging system 242 amends the requested content in its completed form during transmission to the client 240, the location and number of times content is inserted can be controlled, which may not be possible in a system where content is inserted before the page is transmitted to the client. The system also allows inserted content to be tailored directly to the actual content of the page sent to the client, and allows content to be inserted in the correct location to ensure the display is not negatively affected by the insertion of the content.

The method described above results in content being inserted into the page received by the client, thereby allowing the display of advertising, or the performance of other functions. In order for this content to appear in the page received by the client, there is no need to modify the page stored on the server, thereby removing any dependence of the behaviour of the inserted content on the actions of the page provider. The overhead of maintaining correct content on the server 241 is thus reduced, whilst retaining the ability to insert advertisements and other functions into pages served by server 241.

As has been explained, the correct insertion of content, and in particular tags, when content management systems are utilised is problematic. Because the current invention inserts content after the creation of the page for transmission to the client, relevant content can be inserted in the correct location, regardless of what is included in the page by the content management system. Furthermore, no modification of the templates utilised by the content management system is necessary to ensure correct insertion of the content. Since the tagging system receives the page in the form in which it has been transmitted by the server to the client, it is possible to insert a particular item in any required manner. For example, a single piece of content may be inserted multiple times, or more than one item of content may be inserted into a particular page.

In the foregoing description, tagging system 242 has been described as a separate system to server 241. However, it is also possible for the tagging system to be incorporated into the server 241. The method operates as described above, but there is no requirement to configure the network to redirect requests and responses through the tagging system. When the tagging system is configured as a separate system, it may either be located in the same physical location at the server, or alternatively may be in a different location. By suitable configuration of the network routing information, requests and responses can be routed to the tagging system as required regardless of its physical location, provided suitable network connections are provided.

When content is inserted into a page, it is important that it is inserted at the correct location. For example, the correct location for content may be immediately after a particular label in the page. If content is inserted in an incorrect location it may cause the content to function incorrectly, or more seriously may cause the whole page to display incorrectly. Tagging system 242 may be configured to insert content into a wide range of pages, each of which may have a different structure. Tagging system 242 must therefore analyse the page to find the correct location for the particular content being inserted and insert the content at that location. For example, a page comprising the following text may be received by tagging system.

```
<HTML>
<HEAD>
<TITLE=TEST PAGE>
</HEAD>
<BODY>
Text
<IMG SRC=IMAGE1.JPG>
</BODY>
</HTML>
```

The optimum place for insertion of content into this example page depends upon the content that is to be inserted. If the content is a tag used to track a user's behaviour in respect of the page it may measure the page load time. In order to assess that time, the tracking code must be aware of the time at which loading started and the time at which it finished. It is therefore important that the content performing the tracking is inserted close to the top of the page such that it can measure the load-start time as accurately as possible. If the content were to be inserted after the <IMG> label, the load-start time could not be accurately measured as the image may take a substantial amount of time to load. In this example, therefore, it would be preferable to place the content immediately after the <BODY> label.

However, if the content to be inserted is an advertisement, it may be desired that the advertisement is placed at the bottom of the page. In that case, the content would be preferably inserted immediately before the </BODY> label such that it appears in the desired location.

In the above example, the correct location can be identified by searching the served page for a certain text string, for example </BODY> and inserting the content immediately after that string. However, pages may be significantly more complex than the above example, and therefore require other techniques to find the correct location. For example, a page may contain a script that writes certain parts of the page upon its receipt by the client. In such an example the correct location must be identified based upon the action of the script when the page is written, rather than the actual content of the page upon its receipt by the tagging system.

It may also be desirable to insert more than one piece of content in a single page. For example, tracking code could be inserted at the top of the page to track page load times, while advertisement could be inserted at the location selected for correct display of the advertisement.

Figure 26:
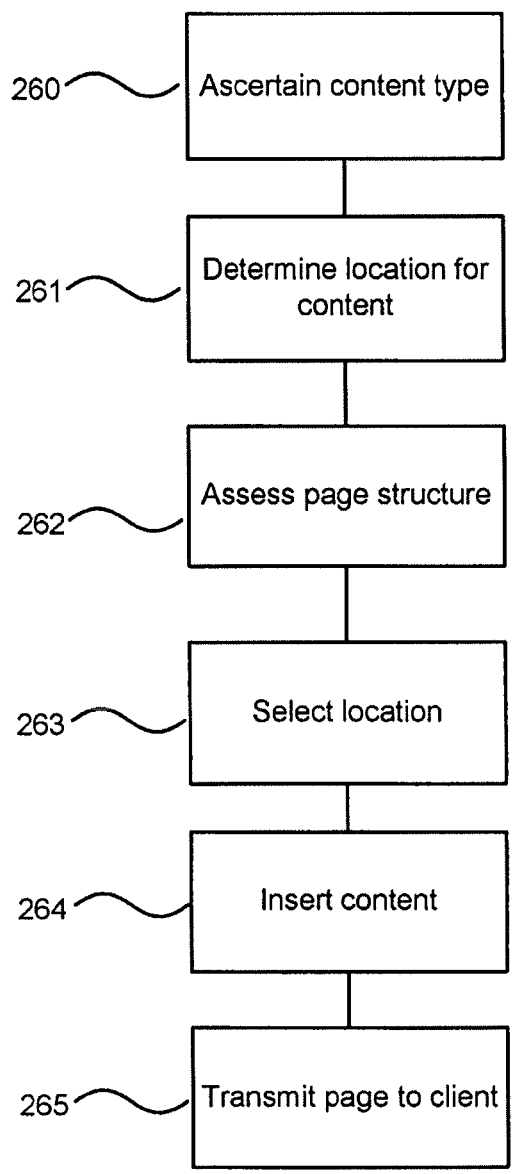
FIG. 26 is a flow-chart of a method of inserting tags in a page.

FIG. 26 shows a flow-chart of a process of inserting content into a page. The tagging system ascertains (block 260) the type of content (for example, tracking code or an advertisement) to be inserted, and determines (block 261) the location at which that content should be inserted. The content may contain metadata indicating the location, or the tagging system may access stored data to determine the correct insertion location. The system then analyses the structure of the page (block 262) and determines (block 263) the correct point for insertion. The analysis of the page may be performed by parsing the page and searching for certain features, or by any other appropriate method.

The content is then inserted into the page (block 264) and the tagging system transmits the page to the client (block 265).

By this process it is ensured that content always appears in the correct location without requiring human intervention to insert the content in the correct location.

Pages may be designed to have a very particular appearance, for example pages may be designed to appear correctly when displayed at a computer screen's natural aspect ratio. If content, for example an advertisement, is added along any of the edges of such a page, without other modifications being made, the page appearance may be harmed. The inventory of pages available for the display of advertisements in this fashion is therefore reduced. There is therefore provided, as explained below, a method of allowing the display of content while retaining the aspect ration and appearance of the page to which the content is added.

Figure 27:
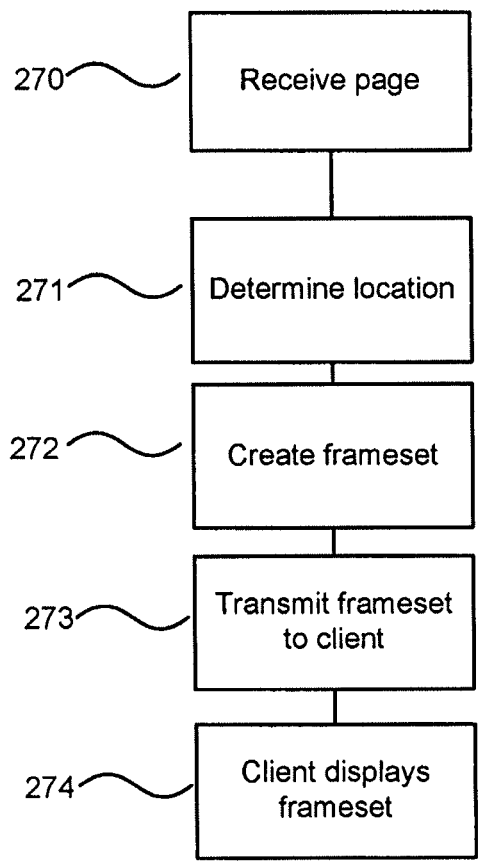
FIG. 27 is a flow-chart of a process of creating space for the provision of content.

FIG. 27 shows a flow-chart of a method of creating space for the display of content utilising the system shown in FIG. 24.

A page to which content is to be added is received by the tagging system (block 270). The location for addition of the content is then determined (block 271). For example, content that is a wide, shallow, advertisement may fit best at the bottom of a page. To assist in the determination of location, information may be provided with the advertisement (e.g. in the form of metadata) to specify the location in which it should be displayed. Position may also be determined based on the price paid for placing the content, with more desirable locations, for example the top of a page, attracting a higher price.

At block 272 a frameset is created, with the page in one of the frames and the inserted content in another of the frames. The layout of the frames and the frame into which the content is placed may be selected dependent upon the characteristics of the content. The page to be displayed, and the content, may be placed into their frames by the insertion of tags in the definition of the frames or by including the actual content in the frames. The frameset is transmitted (block 273) by the tagging system to the client, which then displays (block 274) the frameset including the page requested and the content referenced by tags inserted by the tagging system.

Figure 28:
FIG. 28 is an example frame-set.

FIG. 28 shows an example frameset 280. Main frame 281 displays the page, and since the main frame retains the aspect ratio of the full screen, the page is displayed with no affect on its appearance. Border frames 282, 283, 284, 285, 286, 287, 288 and 289 may be used for the inserted content or may be presented as blank spaces of an appropriate colour. For example, the colour of the border, other than those parts used for the content, may be coloured in the same way as the background of the page.

Figure 29:
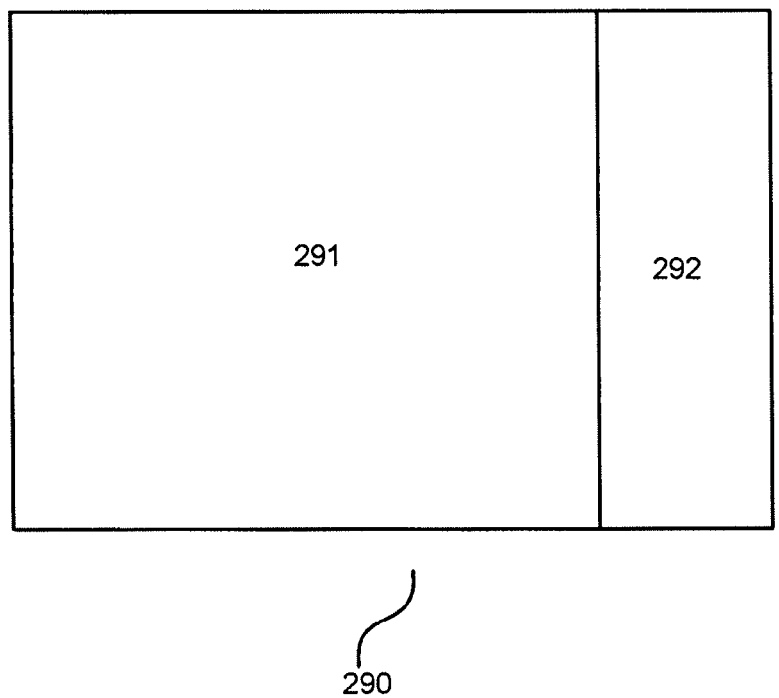
FIG. 29 is an example frame-set.

The tagging system may define the layout of the frame-set dependent upon the content of the page and the inserted content. Accordingly, the sizes of each of the frames and their position can be defined dependent upon the features of the page and content. For example, if a page contains only text, the frameset 290 shown in FIG. 29 may be appropriate. When presenting text a tall window is desirable as it allows the reader to read a long section of text without scrolling. The frameset of FIG. 29 thus uses frame 291 which is the full screen height for the display of the text, and utilises frame 292 for the display of the inserted content. Content has thus been added to the page without affecting its appearance in a negative manner.

Figure 30:
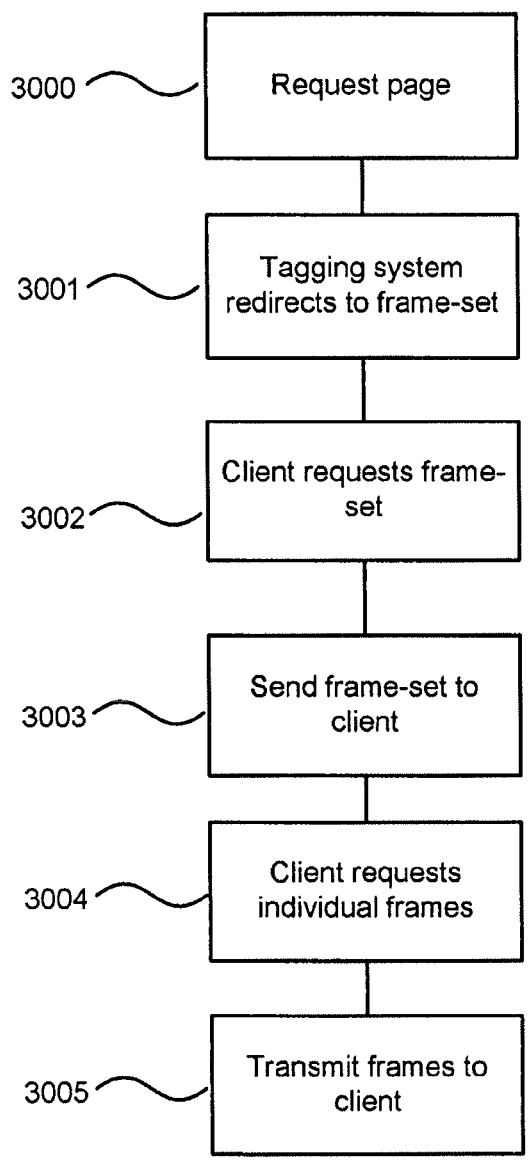
FIG. 30 is a flow-chart of a method of creating space for the provision of content.

FIG. 30 shows a flow-chart of an alternative method of creating space around a page for the display of content.

A client requests (block 3000) a page for which tagging system 242 is configured, and so the request is routed to the tagging system as explained above. The tagging system responds (block 3001) to the request with a redirect to a frame-set having a required layout. The layout may be selected, as explained above, by reference to the content to be inserted or the page requested, or alternatively a single layout may always be utilised.

In response, the client requests (block 3002) the frame-set according to the redirect sent by the tagging system. The frame-set may be stored on the tagging system, or on a different server associated with the address provided by the tagging system in the redirection instruction. The frame-set is sent to the client (block 3003). The frame-set includes links to the pages to be displayed in each of the frames of the frame-set. Upon receipt of the frame-set the client requests (block 3004) each of the individual frames according to the links provided. The individual frames are then served (block 3005) to the client and displayed by the client.

As explained above, one of the frames of the frame-set includes the page originally requested by the client, and the other frames may be used for the presentation of content, or presented in an appropriate fashion to not detract from the page being displayed. The frames may present content created by a content management system in response to a request, or furthermore, content generated by the tagging system, or an associated content generation system, may be presented in one or more of the frames.

If the request for the individual frames is interpreted by the tagging system as a request for a new page, it would respond with a further frame-set and an infinite loop would be entered. Therefore, when the individual frames are served to the client, the tagging system detects that the request is for individual frames, rather than a new request for a page. The request for individual frames can be detected as such by detection of the referrer for the request (if the referrer is the tagging system, the request is for an individual frame), or alternatively the link provided by the tagging system for one or more of the frames may contain an indication that it is a link for an individual frame and therefore should not be intercepted by the tagging system, but rather passed to the server for the page to be sent to the client. The indication may, for example, be a parameter added to the address.

The above methods create additional inventory that can be utilised to present content, for example advertisements or news, to users.

As has been explained, in order to display advertisements in a page using current methods, tags are inserted into the content stored on the server. When that page is received by a client, the tag causes an advertisement to be displayed that corresponds to the information in the tag. The tag that is inserted in the page therefore defines the source of the advertisement that is displayed. If a content provider wishes to change the source of advertisements applied to their pages they must update the tags, which is a time-consuming process. It is therefore impractical to change advertisement providers on a regular basis, thereby limiting the ability of content providers to continually obtain the best pricing for providing advertisements.

Figure 31:
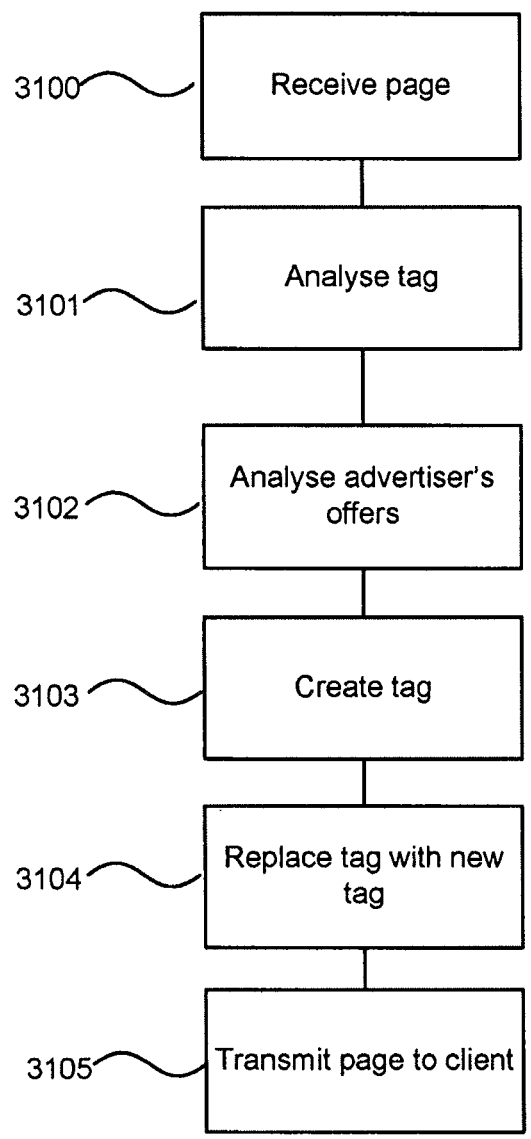
FIG. 31 is a flow-chart of a method of replacing tags.

FIG. 31 shows a method by which tags provided to clients can be changed on a dynamic basis.

The tagging system receives a page containing a tag for an advertisement (block 3100) and ascertains the details of that tag (block 3101) and the page. For example, the tagging system may ascertain the size of the advertisement and the subject of the page. The tagging system then analyses (block 3102) which advertisement provider is offering the most beneficial terms for including an advertisement in the page. For example, the advertisement may be selected dependent upon which advertisement provider has the most appropriate advertisements, or advertisers may be asked to bid based on the content of the page and the highest bidder selected. A tag which will cause the selected advertisement to be displayed is created by the tagging system (block 3103). That tag may utilise details of the existing tag, such as the size of the advertisement, in order to avoid changing the appearance of the page.

The tagging system then removes the existing tag and replaces it with the tag created (block 3104). The page is then transmitted (block 3105) to the client, where upon its receipt the advertisement corresponding to the new tag will be displayed. This process allows the content provider to access a number of advertisement providers and thus always receive the optimum payment for the display of advertisements. In an alternative to the active selection of an advertiser, the current advertiser may be statically defined. For example, the tagging system may be configured to always replace Microsoft™ advertisements with Google™ advertisements.

This method also reduces the effort required by advertisers to insert advertisements into pages and increases the page inventory available for an advertiser to utilise.

The foregoing description has focussed on the replacement of advertisement tags, but the method is also applicable to any type of tag.

Figure 32:
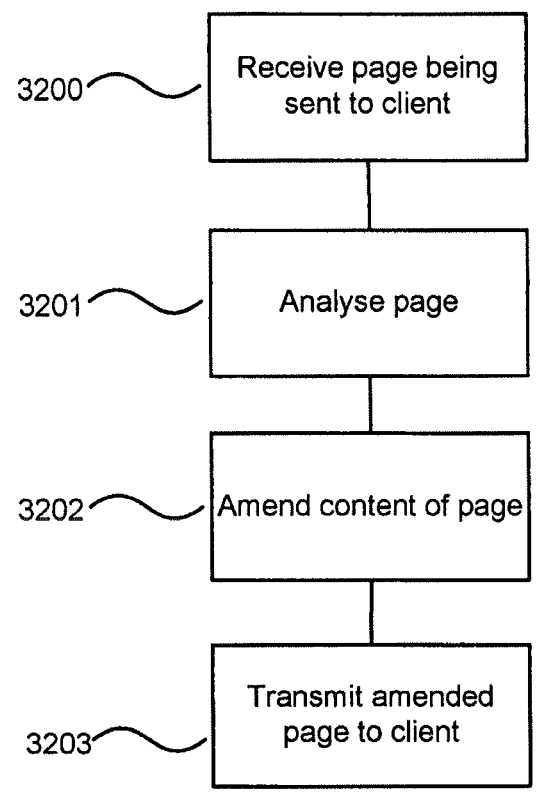
FIG. 32 is a flow-chart of a method of amending content transmitted to a client.

FIG. 32 shows a method of modifying the content of pages utilising the system of FIG. 24.

A page requested by a client is received (block 3200) by the tagging system 242. That page is then analysed by the tagging system (block 3201) according to rules defined in tagging system 242. For example, tagging system 242 may be configured to search for occurrences of a particular key-word. Content identified by the analysis is then amended (block 3202) as defined by the configuration of the tagging system. For example, the key-words identified may be amended to be presented as links to content related to those words. The amended page is then transmitted to the client (block 3203).

This method allows content providers to benefit from content to which they have not previously had access. For example, an advertiser may elect to include a link to their adverts in every occurrence of a particular word in pages related to their product. This is achieved without requiring any action on the part of the page provider and so the advertiser is not reliant on page providers to enable the provision of advertisements, thereby increasing the page inventory available to them. In addition to the provision of links to advertisements, this method can also be used, for example, to provide links to relevant articles or news.

In an alternative embodiment the tagging system may transmit code to the client which causes the client to perform the steps described in the method of FIG. 32. For example, a piece of javascript could be inserted using the method of FIG. 26.

The methods described in relation to FIGS. 26, 30 and 32 may be used in combination with each other. For example the method of FIG. 3 may be used to insert code to track a users behaviour and the method of FIG. 32 may be used to highlight text for which additional information is presented in a space created by the method of FIG. 30. Various combinations of the methods are possible to provide improved facilities to content providers.

In an example application the above methods may be utilised in the context of the World Wide Web and the delivery of web-pages to clients from web-servers. In this context, the clients referred to herein would be web-browsers operated by users of the computers on which the web-browsers are running. The mark-up language utilised would be HTML, or extensions thereof such as XML. In this context requests for content will be made by web-browsers to specific web-servers, which servers would be identified by their domain name and related Internet Protocol (IP) address. Routing information would be provided by Domain Name Servers, which would be configured to route requests and responses through the tagging system described herein.

The above examples and description have been given primarily in relation to the HTML mark-up language. However, the invention is also equally applicable to other mark-up languages which may be used.

The term 'page' is used herein to describe the content sent by a server in response to a request by a client.

Where the term 'advertisement' has been utilised, it is intended to refer to any content added to a page and not solely to advertisements for services or products. For example, an 'advertisement' may be inserted displaying the hosting company on which the page is stored, or listing copyright information for the content.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Figure 33:
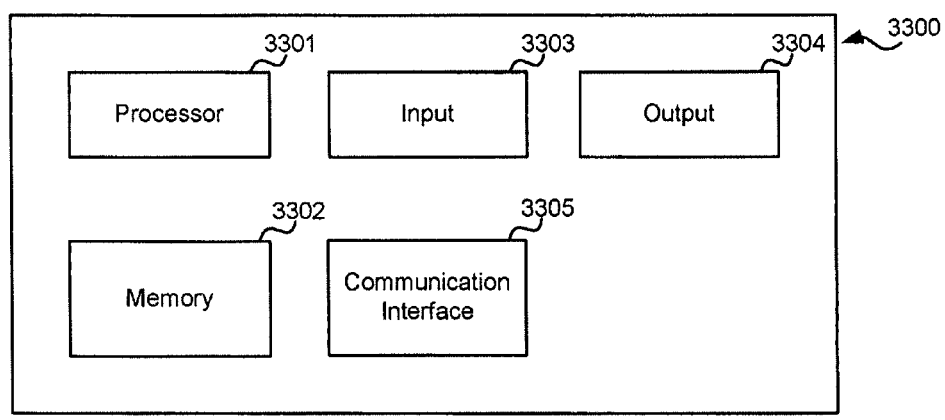
FIG. 33 illustrates various components of an exemplary computing-based device.

FIG. 33 illustrates various components of an exemplary computing-based device 3300 which may be implemented as any form of a computing and/or electronic device, and in which embodiments of the methods described herein may be implemented. The computing-based device 3300 comprises one or more processors 3301 which may be microprocessors, controllers or any other suitable type of processors for processing computing executable instructions to control the operation of the device. The computer executable instructions may be provided using any computer-readable media, such as memory 3302. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system or any other suitable platform software may be provided at the computing-based device (e.g. stored in memory 3302) to enable application software (which may also be stored in memory 3302) to be executed on the device. The computing-based device may also comprise one or more inputs 3303 and/or one or more outputs 3304. The input 3303 may be of any suitable type for receiving media content, Internet Protocol (IP) input, user commands etc. The output 3304 may comprise an audio and/or video output to a display system integral with or in communication with the computing-based device. The display system (not shown in FIG. 33) may provide a graphical user interface, or other user interface of any suitable type although this is not essential. The device 3300 also comprises communication interface 3305 through which the device is connected to one or more other devices over a network and/or over point to point links. The elements 3301-3305 within the computing-based device are connected by means of a bus (not shown in FIG. 33).

In order to track the history of a user's web-access it is necessary to be able to establish a common identity for each user between domain names.

The current invention provides a method of identifying a user between domain names without the use of third-party cookies. As has been described hereinbefore the use of third party cookies is undesirable as they lead to security and privacy concerns.

Figure 34:
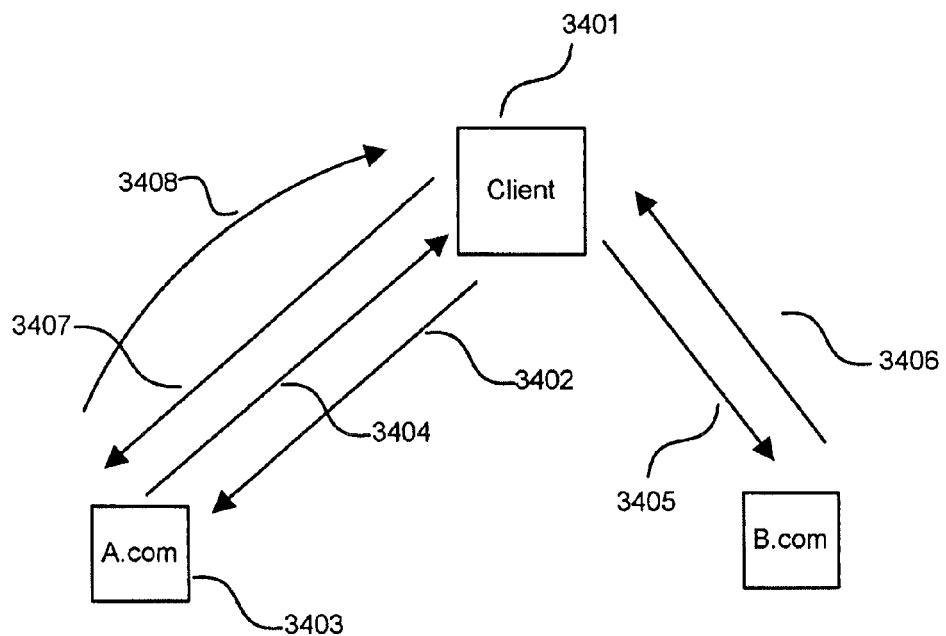
FIG. 34 is a schematic network diagram of a client and two web-servers.
Figure 35:
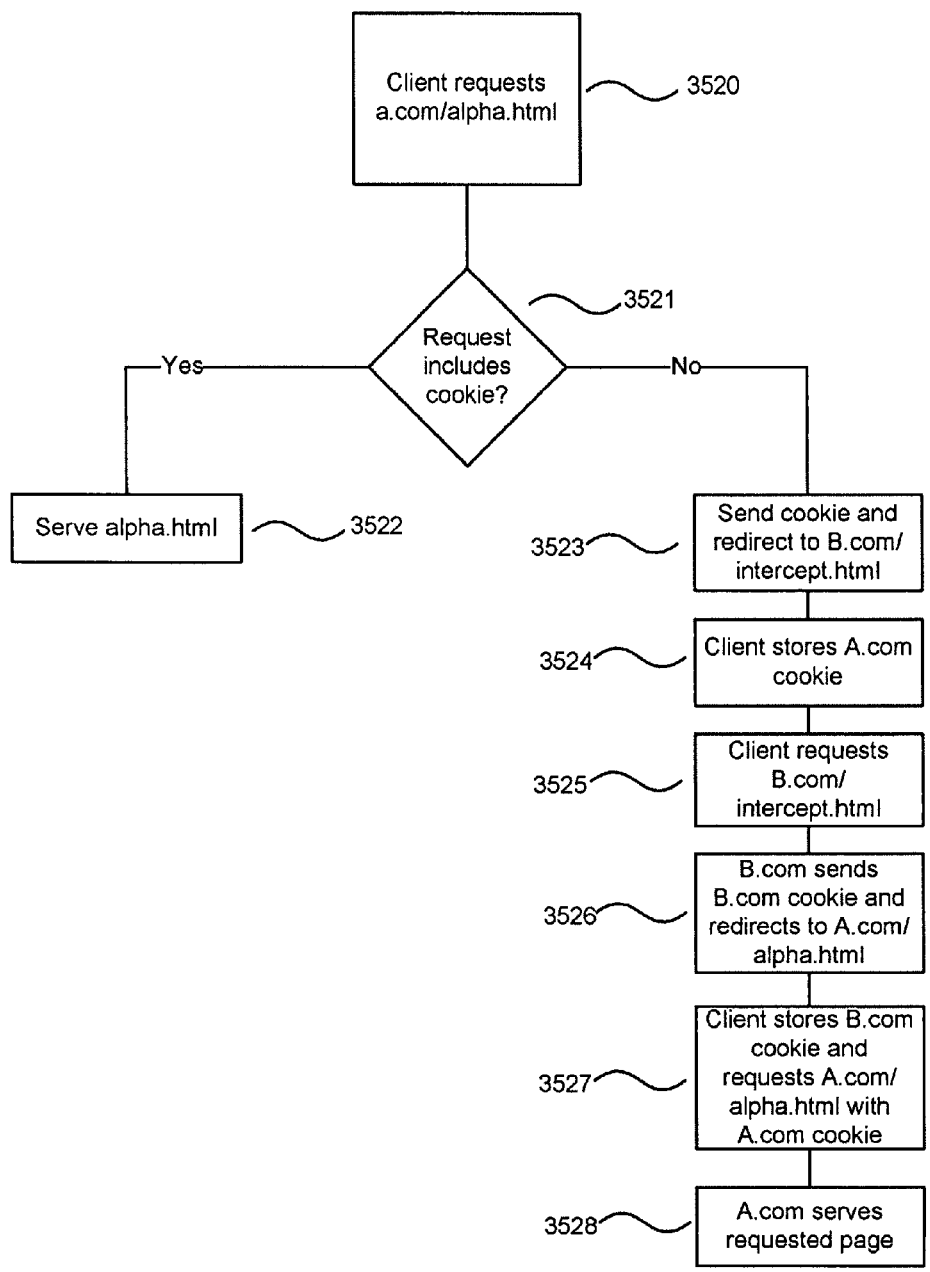
FIG. 35 is a flow-chart of a process for assigning a common identity between two domains, when the client visits the master domain first.

In FIG. 34, A.com and B.com are domains which may be visited by a client computer 3401. FIG. 35 shows a flow-chart of a method of establishing a common identity for client 3401 between A.com and B.com. Arrows in FIG. 34 indicate transmissions of information during the assignment of a common identity to the client according to the method of FIG. 35.

A user of the client computer 3401 may wish to access "a.com/alpha.html" located on A.com. At block 3520 the client computer 3401 issues a request 3402 for that content, which request 3402 is routed to the server 3403 of A.com according to the routing data associated with A.com. Upon receipt of the request A.com analyses the request (block 3521) and ascertains whether it includes a cookie for A.com. If the request does include a cookie then the client already has an identity on A.com from a previous visit and the requested content is served directly to the client at block 3522.

As will be apparent to the skilled reader cookies are stored by a web-browser in relation to a user's account on that web-browser. The identity provided by a cookie therefore is that of an account on a web-browser, which does not necessarily correlate to a single user, because a single account may be used by more than one user. Furthermore, a single user may have multiple accounts and therefore be identified by multiple cookies. However, for purposes of clarity, the term 'user' will be used to describe the entity identified by a cookie. The term 'client' is used to describe the computer and web-browser used to request and receive content from web-servers.

If at block 3521 the request does not include a cookie for A.com then the user is considered to not have an identity on A.com (it may be that an identity does exist but the cookie has been lost, in which case the identity may be recovered as described below). A.com recognises the lack of a cookie and instead of responding with the requested web-page, responds (3404, block 3523) with a cookie containing an identity for the user, and with a redirect to a predefined page on B.com. For example, if the user is to be assigned the identity '1', A.com may respond with "redirect B.com/intercept.html?ID=1&A.com/alpha.html". Upon receipt of this response, the client stores the cookie sent by A.com (block 3524), and at block 3525 requests 3405 intercept.html from B.com with the parameters supplied by A.com.

"intercept.htm" is a predefined page on B.com that is used to indicate to B.com that the request is in relation to a user's identity, and not a request from a user for content. The parameters associated with the content request (ID=1 and A.com/alpha.html) notify B.com of the identity assigned by A.com and the page on A.com that the user originally tried to access. B.com replies 3406 at block 3526 to the request with a cookie containing the same identity as that given by A.com, and with a further redirect to the page originally requested, for example "redirect A.com/alpha.html". The cookie from B.com is received by the client in the context of content from B.com (a redirect back to A.com) and so it is categorised as a first-party cookie. The cookie will not therefore be blocked by the client's web-browser, and since it cannot be used to identify the user on other domains (the B.com cookie only allows identification of the user on B.com), it does not create any privacy issues.

At block 3527 the client stores the cookie from B.com and requests 3407 A.com/alpha.html. The A.com cookie stored on the client is sent with the request 3407. When A.com receives the request the presence of the cookie indicates that the user has an identity associated with A.com and so at block 3528 A.com responds 3408 with the requested content (alpha.html).

The client has thus received the content requested and has cookies for both A.com and B.com, each of which contains the same identity. Subsequent requests to A.com or B.com can thus be attributed to the same user, allowing that user's access history on A.com and B.com to be compiled. By extension of the method to more domain names, a more complete history can be compiled.

The identity may be encoded directly into the cookie in which case each cookie for a given user will contain the identity of the user. Alternatively, cookies may each contain a unique reference number, which is related to a user by a database containing the reference numbers and identities. In this example, the database would contain the reference number of the A.com and B.com cookies and the user identity to which they relate. That database may be held at either A.com, B.com or a remote computer in contact with A.com and B.com. Where herein cookies are described as having a particular identity, this is intended to include both of the above possibilities, or any alternative methods of allowing an identity for a particular cookie to be established.

Behaviour tracking systems can be utilised to acquire more complete information about user's behaviour in relation to domain names on which the user has an identity. For example, U.S. Pat. No. 6,763,383 describes methods of acquiring user information suitable for use in conjunction with the current invention. The code discussed in U.S. Pat. No. 6,763,383 can be transmitted to the user with the cookie described hereinbefore. The user's identity may be included in the information sent by the tracking system, thereby allowing correlation of logs received by many domain names.

Figure 36:
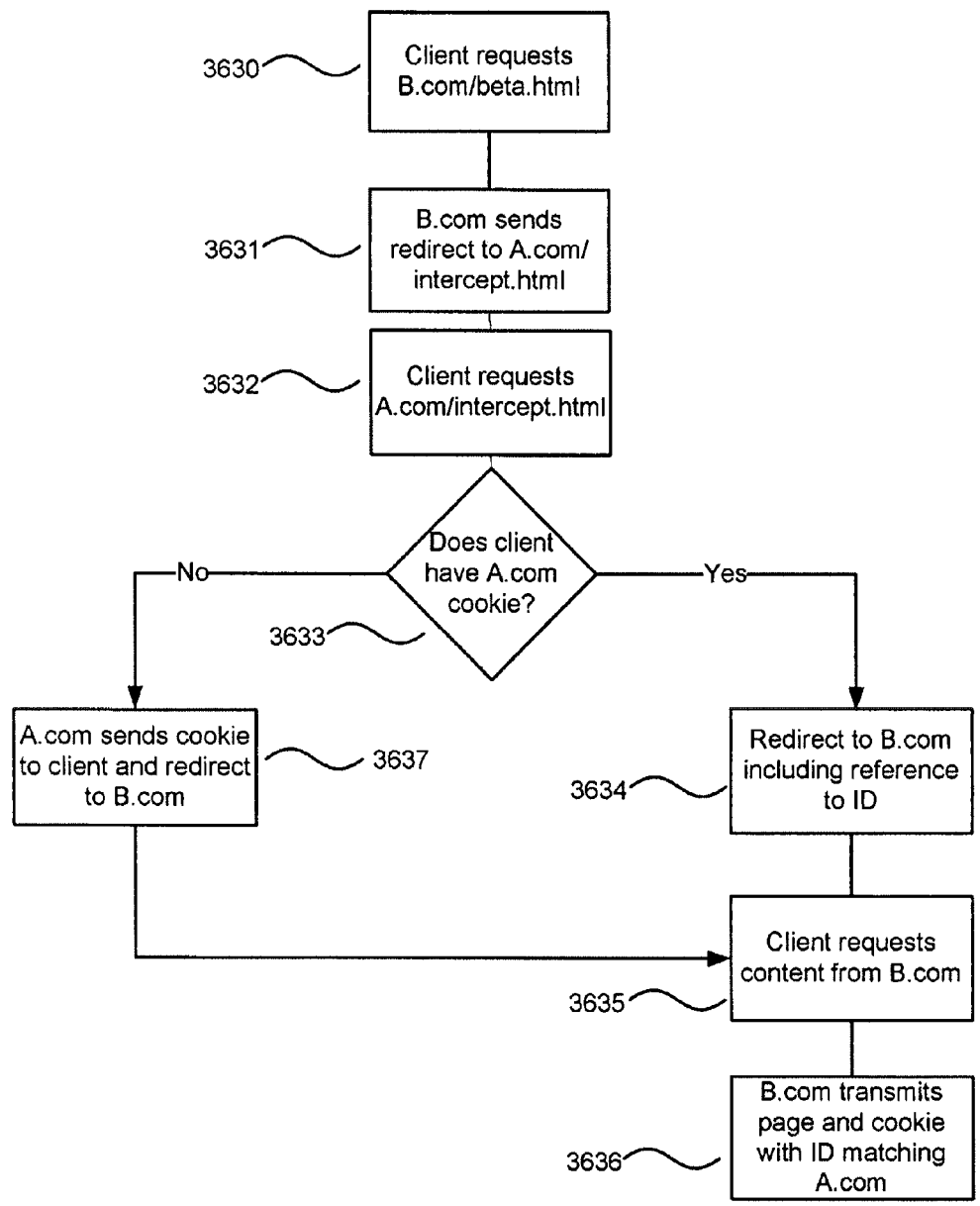
FIG. 36 is a flow-chart of a process for assigning a common identity between two domains, when the client visits the slave domain first.

In the current example, A.com acts as a master web-server and B.com as a slave web-server in relation to the assignment of identities. These names are only used in relation to the function of assigning identities performed by the web-servers and do not imply any structural or hierarchical differences. To avoid an identity being duplicated, the master (A.com) is responsible for selecting and assigning new identities, while the slave (B.com) only assigns an identity when instructed to do so by A.com. Due to the difference in function of master and slave servers, the method of assigning a new identity varies dependent upon whether the user first visits a master or a slave. In the foregoing example, the user first visited a master (A.com). FIG. 36 shows a flow-chart of a process to assign a common user identity between two domain names (A.com and B.com) in the event that a user visits a slave (B.com) first.

Upon receiving a request at block 3630 for B.com/beta.html, without a B.com cookie, B.com responds at block 3631 to the client with instructions to request A.com/intercept.html?B.com/beta.html at block 3633 (i.e. the client is redirected to A.com/intercept.html). As explained previously, intercept.html is predefined as a page for assigning identities. The client follows this redirect and requests A.com/intercept.html?B.com/beta.html. A.com recognises a request for intercept.html as being a request for a new user identity and the parameters as identifying the content that was initially requested by the client.

At block 3633 A.com checks if an A.com cookie was received with the request, the presence of which indicates that the user has previously visited A.com and has been assigned an identity. If that is the case the user has an A.com cookie, but not a B.com cookie. If the method described above has been used to assign identities this will only occur if the B.com cookie has been deleted or has expired, because A.com and B.com cookies are, in that method, always assigned together. However, in alternative methods, when a user visits a master site for the first time, only an identity for that master site may be assigned, with identities for other sites being assigned as the user visits those sites. A.com responds (block 3634) with a redirect to B.com/beta.html&ID=2, where the identity provided corresponds to that of the user's A.com cookie. The client follows the redirect and at block 3635 requests B.com/beta.html&ID=2. B.com recognises the parameter ID=2 as an instruction to assign the identity ID=2 to the user and, when serving beta.html to the client, also sends a B.com cookie having that identity (block 3636). The client thus acquires both A.com and B.com cookies corresponding to the same identity.

If at step 3633 the request to A.com is found to not include a cookie, then A.com assigns the next available identity and in addition to responding with the redirect as set out above in relation to block 3634 also sends an A.com cookie to the user including that identity (block 3637). As in the previous case, the client thus acquires A.com and B.com cookies having the same identity.

The identification system relies on the A.com and B.com cookies being retained by the user and being sent with each request for content from A.com or B.com. If either of the cookies are deleted or expire (i.e. become lost) it may be possible to re-establish the identity of the user by reinstating the cookies. In order to re-establish the identity various methods set out herein may be utilised and the user can be identified as previously having had an identity, the ability to track the user may be recovered by reinstatement of the cookies.

If only the B.com cookie has been lost, it will be reallocated as explained above in relation to FIG. 36, when the user next visits B.com.

If only the A.com cookie has been lost, a new A.com identity is assigned as explained below in relation to FIG. 37 by reconstructing the user's identity from their surviving B.com cookie.

Figure 37:
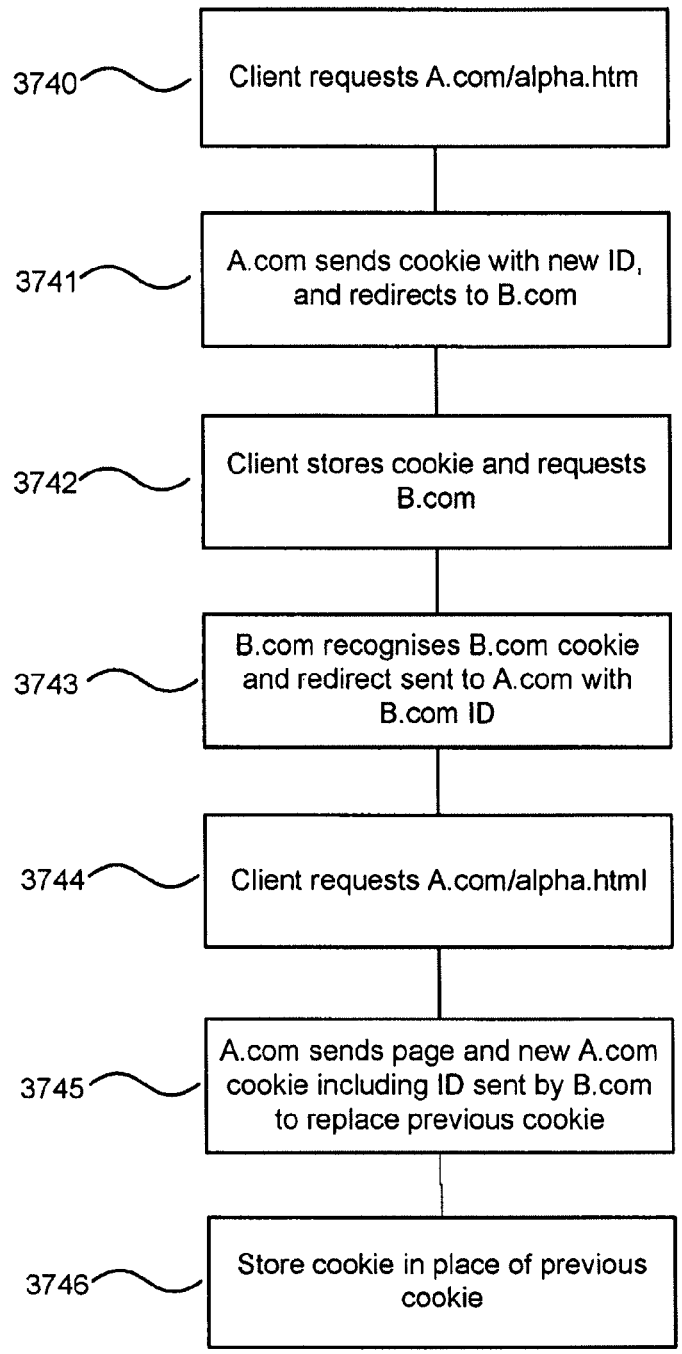
FIG. 37 is a flow-chart of a process for re-assignment of an identity when the master domain's cookie has been lost.

At block 3740, A.com receives a request for A.com/alpha.htm, but no cookie is present with the request because it has been lost and so A.com assumes this is a new user and begins following the same steps described in relation to FIG. 35 (blocks 3740-3742 in FIG. 37). However, at block 3742, since client has a cookie for B.com, that cookie is sent with the request to B.com. When B.com receives the request for a new identity with a B.com cookie it recognises that the A.com cookie has been lost. At block 3743 a redirect is sent to A.com/alpha.html together with parameters indicating that an identity matching that given in these parameters should be assigned. At block 3744, the client requests alpha.html from A.com with the parameters given by B.com. At block 3745 A.com serves alpha.html together with a cookie having the identity specified. At block 3746 that cookie is stored in place of the previous cookie by the client. Thus the previous identity is reinstated and the A.com and B.com identities correspond to each other.

The new A.com cookie may have the same identity as the cookie that has been lost, or alternatively may have a new identity that is related to the previous identity by a database which is used to record correlations between identities. In an alternative method, no replacement cookie is sent at block 3745, but an entry is made in a database to correlate the old and new identities, thus allowing data from the old and new identities to be related to the same user.

If both of the cookies have been deleted the user's identity cannot be directly recognised and the process is restarted as if the user had not previously had an identity. However, it may be possible to link the old and new identities, and thereby establish a consistent identity.

If either A.com or B.com has a log-in system, a database may be maintained relating user log-ins to identities. Each time a user logs-in this database can be updated to relate the user's current cookies to any previous ones that may have been lost. Once this link is established, the previous identities could be sent to the client to replace their current ones, or the link could be recorded in the database.

Alternatively, the client's network address or other information may be used to attempt to match the user to a preexisting identity. If a match can be made the same identity may be reissued, or a new identity is sent and related to the old one.

The methods described above require that the client computer accepts and stores cookies. For security reasons, users may set their web-browser to not accept cookies, thereby preventing operation of the above-described methods. For example, in the method set out in FIG. 35, the client would be continually redirected between A.com and B.com as requests will never be accompanied by a cookie and so each server will continually redirect the client in order to assign an identity to that user. If this occurs the client will be in an unending loop and unable to view the pages requested. A mechanism is therefore required to detect such behaviour and prevent it occurring.

One solution is to detect whether a client's request for a valid page (i.e. not an "intercept.html" page) is a direct request or one that has resulted from a redirect instruction. From the methods described herein it is clear that redirects to "real" pages should only occur once the user has a cookie for the domain to which the request is directed. The lack of a cookie can thus be assumed to indicate that the client's computer is not accepting cookies.

The lack of acceptance by cookies can also be determined by checking what the referring domain is for a request for a real page. If a request for a real page on A.com is received by A.com and the referring domain is B.com, the absence of a cookie will indicate a lack of acceptance of cookies.

In a further method of checking for the acceptance of cookies, the address or parameters passed by a domain during a redirect, when that redirect should be accompanied by a cookie, may be selected specifically to indicate that a cookie should be present. If a domain receives a request that includes an indication in the address or parameters that a cookie should be present, but no cookie is received, then it is clear that cookies are not being accepted by the client.

Figure 45:
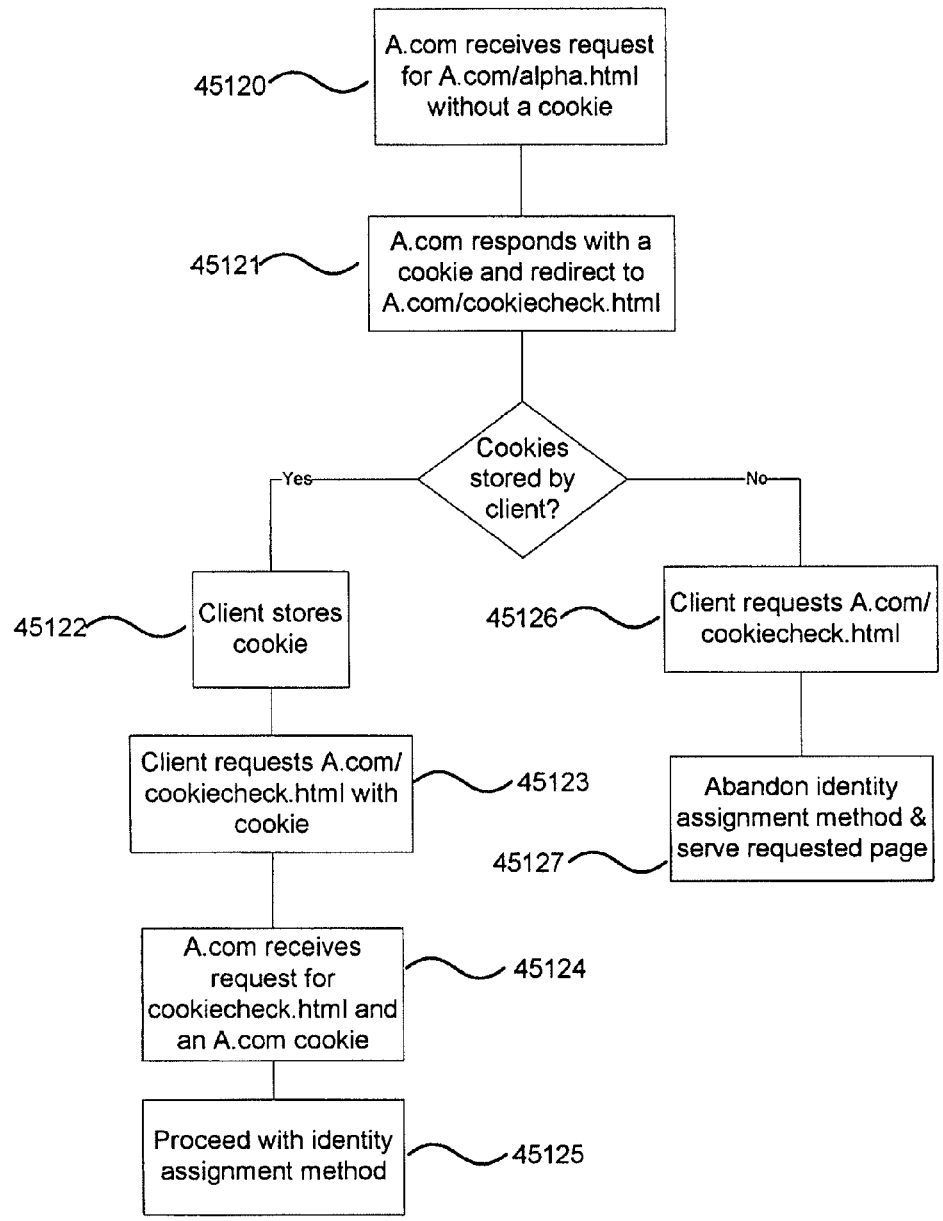
FIG. 45 shows a flow-chart of a method of assessing whether a client is accepting cookies.

FIG. 45 shows a flow chart of a method of directly checking whether a client is accepting cookies. At block 45120 A.com receives a request for alpha.html without a cookie. The lack of a cookie indicates that the user has not been assigned an identity on A.com, or that the cookie has been lost. Before attempting to assign an identity to the user, the client is first checked for the acceptance of cookies. At block 45121 A.com responds to the client with a cookie for A.com (this cookie may be a temporary identity cookie or may correspond to the identity that may be assigned to the user if the check is successful) and a redirect to A.com/cookiecheck.html. If the client is configured to store cookies, at block 45122 the cookie will be stored on the client and at block 45123 the client requests cookiecheck.html from A.com, together with the A.com cookie. At block 45124 A.com receives the request and recognises the presence of an A.com cookie. The presence of the cookie indicates that the client is accepting cookies and an identity is established for the client utilising one of the methods described herein. If the client is not accepting cookies, at block 45126 a request is made for A.com/cookiecheck.html, but since according to the client's configuration the A.com cookie was not stored, that request is not accompanied by a cookie. A.com recognises the absence of an A.com, which indicates the lack of acceptance of a cookie. At block 45127 A.com does not proceed with assigning an identity to the client, but serves the requested page. Alternatively, an alternative identification system may be employed that does not rely on the client accepting cookies.

The methods described herein rely on cookies for operation and so once it has been determined that a client is not accepting cookies, other methods need to be utilised to establish a common identity It is desirable to establish a common identify over as many domains as possible in order to be able to generate a complete view of a user's behaviour. The basic principles described above in relation to the establishment of a common identity for a user in relation to two domains can be expanded to an arbitrary number of domains by a continuation of the principles described hereinbefore.

Figure 38:
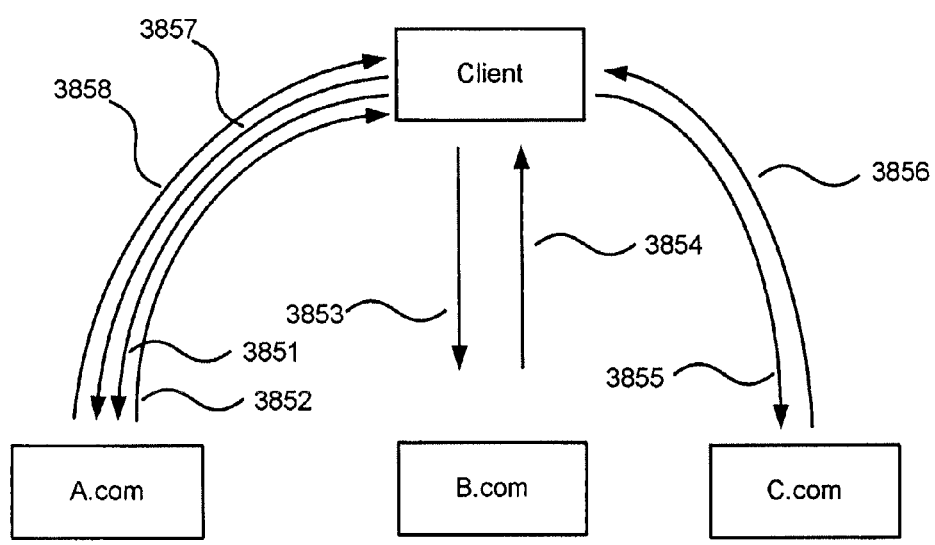
FIG. 38 shows a schematic diagram of a network having three domains and one client.

FIG. 38 shows a schematic diagram of a common identity being established between a network of three domains, A.com, B.com and C.com.

A client requests 3851 A.com/alpha.html, but since the client has not visited A.com previously it does not have a cookie for A.com. A.com recognises this lack of a cookie and instead of serving the requesting page, responds 3852 with a cookie containing an identity, for example ID=1, and a redirect to B.com/intercept.html?ID=1&A.com/alpha.thml. The client follows 3853 this redirect, and as explained above, B.com recognises the request for intercept.html as a request to assign a new user identity, with ID=1, and responds 3854 with a cookie containing that identity. In order to also establish an identity for C.com, the response 3854 from B.com also includes a redirect to C.com/intercept.html?ID=1&A.com/ alpha.thm, which is followed 3855 by the client. C.com recognises the request as a request to assign a new identity and responds 3856 with a cookie containing the requested identity. Since C.com is the final domain in the network, it responds with a redirect to A.com/alpha.html, which is followed by the client. Since the client now has a cookie for A.com, this is sent 3857 with the request for A.com/alpha.html and A.com serves 3858 the page as requested by the client. The client has thus acquired cookies for A.com, B.com and C.com with the same identity.

Figure 39:
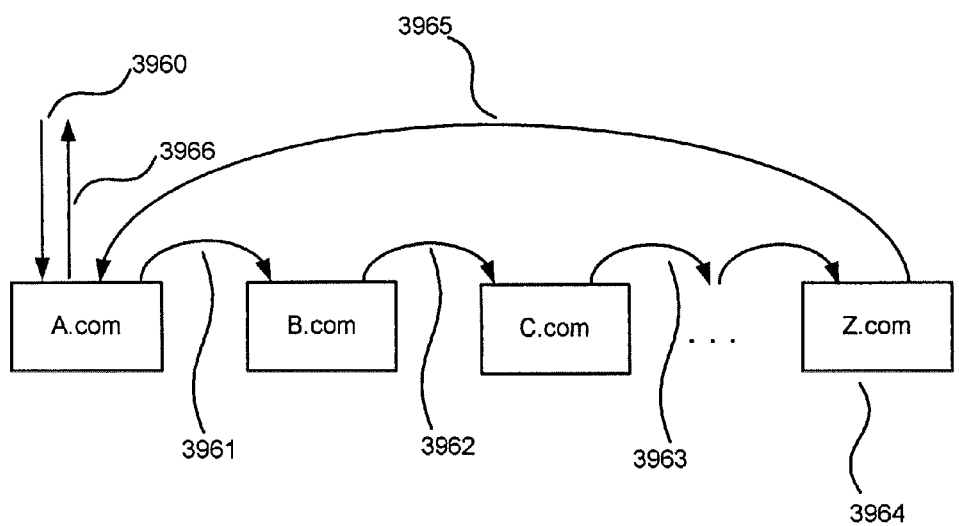
FIG. 39 shows the path of a client's accesses through an arbitrary number of domain names when acquiring a new identity.

The above method can be extended to an arbitrary number of sites. FIG. 39 shows a schematic diagram of the redirects used by an arbitrary number of servers to establish a common identity. The user initially accesses 3960 A.com without a cookie, and A.com responds with a cookie and a redirect 3961 to B.com. B.com recognises the request for a new identity and responds with a cookie and a redirect 3962 to C.com. C.com recognises the request for a new identity and responds with a cookie and a redirect 3963 to the next domain in the chain. Each domain is visited in turn and an identity assigned until the final domain 3964 in the chain is reached, at which point the redirect 3965 is back to A.com, which serves 3966 the page as requested. The client thus acquires identities from all of the domains in the network.

As will be apparent from the foregoing description a common identity is established by the client being redirected to each domain in turn to acquire a set of cookies having the requisite identity. The order in which the sites are visited is not significant to the operation of the method and many permutations are possible. For example, each domain may redirect the client back to A.com, and A.com may then redirect to the next domains in its list. This may be advantageous as it allows a master list of domains to be held by A.com, and amendments to the domains across which an identity will be established can be made by amending that master list. However, a disadvantage of this pattern may be that additional redirects are required to visit all of the domains, thereby slowing the process.

As the number of domains across which a common identity is required increases, it may become impractical for a client to be redirected to all of the domains in the network as that may lead to unacceptable delays in serving the requested page. Furthermore, it is unlikely that a user will visit all of the domains across which an identity can be established and so there may be no requirement to obtain an identity for all of the domains. Described below are methods of establishing a common identity that do not require all of the sites across which the identity is to be established to be visited. The term 'network' is used herein to describe the group of domains across which a common identity is to be established.

Figure 40:
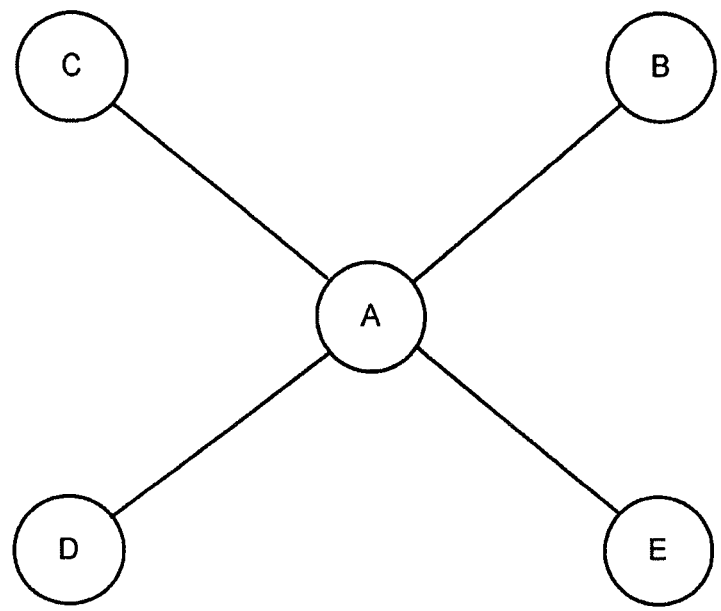
FIG. 40 shows a schematic diagram of a network having one master and four slave domains.

In order to allow for the establishment of a common identity without requiring all of the domains in a network to be visited, one of the domains in the network, as has been described previously, is defined as the master domain, which domain is responsible for storing a master list of identities. The other domains are defined as slave domains which rely upon the master domain to manage and assign identities. FIG. 40 shows a schematic diagram of five domains in which A has been defined as the master domain. The links shown are purely to highlight the topology and do not imply any form of permanent or defined connection, nor does an absence of a link imply no communication.

If the first domain in the network visited by a client is the master domain (A) an identity is selected for the client by that domain and a cookie is sent having that identity. In contrast to the methods described hereinbefore, no redirects are made to provide identities for B, C, D or E to the client, but rather the identity in connection with those domains is assigned when the client visits each domain.

Figure 41:
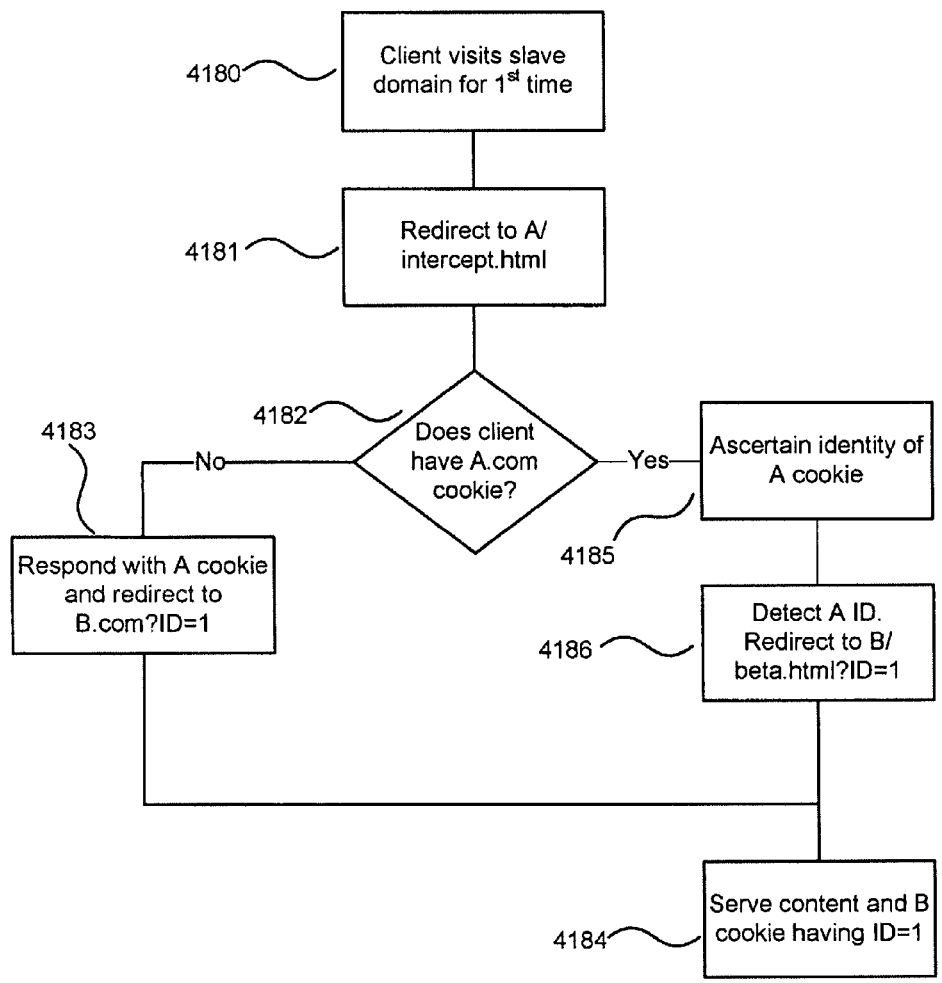
FIG. 41 shows a flow-chart of the process of assigning an identity when a client visits a slave domain for the first time in the network of FIG. 7.

FIG. 41 shows a process of assigning an identity in the network of FIG. 40 when a client visits a slave domain for the first time.

When a client visits a slave domain (e.g. B, C, D or E) for the first time (block 4180), which is detected by the absence of a cookie for the respective site, the site redirects (block 4181) the client to a page on A, which is defined as a page used for assigning identities, for example A.com/intercept.html. The address of the content requested by the client is also included in the redirect such that once identities have been assigned the correct content can be served to the client. The request to A, in response to the redirect, will include a cookie for A if the client has previously been assigned an identity on A. At block 4182 the presence of an A.com with the request is checked.

If the master site (A) detects that the client does not have an identity in the network (i.e. it does not have an A cookie), the site responds (block 4183) with a cookie containing an identity for the client and redirects the client back to the requested content on B, passing as a parameter the identity that has been assigned.

Upon receipt of the request, B responds (block 4184) with a cookie having an identity corresponding to the A identity (as passed in the parameter with the redirect) and with the requested content.

If the master site (A) detects that the client does have an identity of the network, the identity of the A cookie is ascertained at block 4185. A then redirects (block 4186) the client back to the requested content on B and passes the identity as a parameter. Upon receipt of the request, B responds at block 4184) to the client with a cookie having an identity corresponding to the A identity (as passed from A to B in the parameter with the redirect) and with the requested content.

The client therefore has corresponding identities on A and B. The same methods can be utilised for each of the identities in the network. As will be appreciated these methods are comparable to those described in relation to FIG. 36.

The assignment of identities on a domain-by-domain basis reduces the number of transactions at each stage thereby reducing any delay caused by the system as it establishes an identity. Furthermore, an identity on each domain is only established when it is required, thereby reducing the number of identities created that are not used. As explained above, this is particularly important as the number of sites increases.

Figure 42:
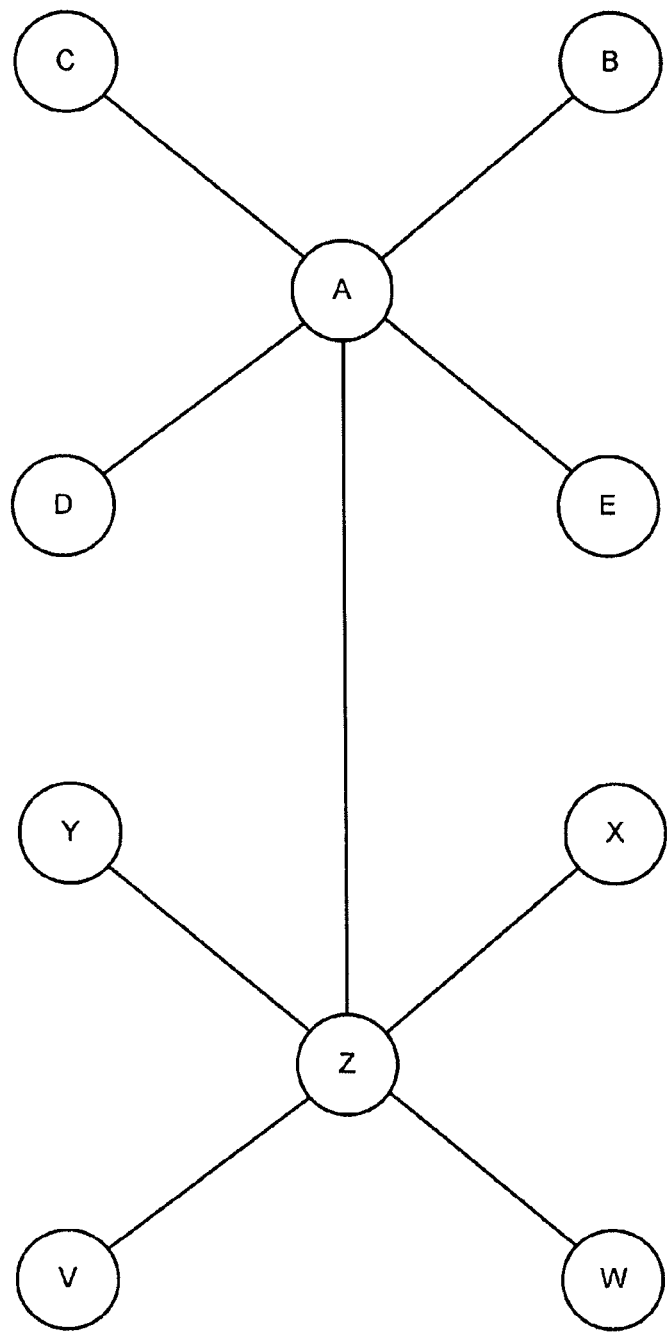
FIG. 42 shows a schematic diagram of a network having two domains kept in synchrony.

Although the above method decreases the number of steps necessary to form a common identity, a single master site must be visited each time a new slave site is visited. In order to reduce the load on the master site a topology such as that shown in FIG. 42 may be utilised.

A is defined as a master domain, and is responsible for assigning new identities. However, each time A assigns a new identity, that identity is also assigned on Z, as per the methods described in relation to FIG. 35. Once a user has an identity on A and Z, the client can visit either of those domains to acquire a new identity on any of the slave domains. For example, when the user visits B, C, D or E for the first time domain A is used with the method of FIG. 41 to assign the same identity for the visited domain. When the user visits V, W, X or Y for the first time, domain Z is used with the method of FIG. 41 to assign the same identity for the visited domain.

The load of creating new identities on slave sites is thus shared between two domains. Although there is an increase in overhead each time a user visits the network for the first time (because identities must be created on two domains—A and Z), this is more than compensated for by the sharing of subsequent load between two domains.

Figure 43:
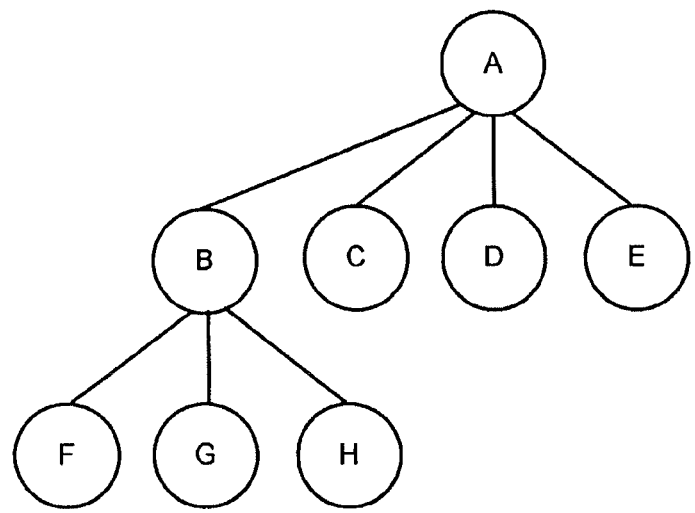
FIG. 43 shows a schematic diagram of a network having three levels of domain.

In order to further reduce the load of assigning identities, domains can also be arranged in a further level of hierarchy as shown in FIG. 43. A is still defined as the master domain. When a client visits one of the domains in the tree for the first time it is redirected up the tree, using the methods described hereinbefore, until it reaches either the master site (A), or a domain for which it has an identity cookie. On the first visit to the network the client will arrive at the master domain which will assign an identity to that client. The client is then redirected back down the tree, and is assigned a matching identity for each domain it traverses. For example, if the client initially arrives at domain F, it will acquire cookies from A, B and F as it traverses the tree from F to A and then back to F. If the same client then returns to the network to H it would be redirected to B, where its identity would become apparent, and then revert to H which would serve the requested page and an identity cookie corresponding to that of B. The load of assigning new identities is thus distributed amongst the various domains within the network.

A mechanism for establishing a common identity amongst domains can be summarised as follows. When a client arrives at a domain for which the client does not have an identity, the client is redirected in steps across the network towards the master domain. If the client reaches a domain for which it has an identity, the client is then redirected back to the initially visited domain, together with information to allow the initially visited domain to assign the same identity. If the client reaches the master domain, a new identity is assigned and the client is redirected back to the initially visited domain together with information to allow the initially visited domain to assign the same identity. The same identity may also be assigned by other domains in the network that are visited by the client during the redirection process.

Figure 44:
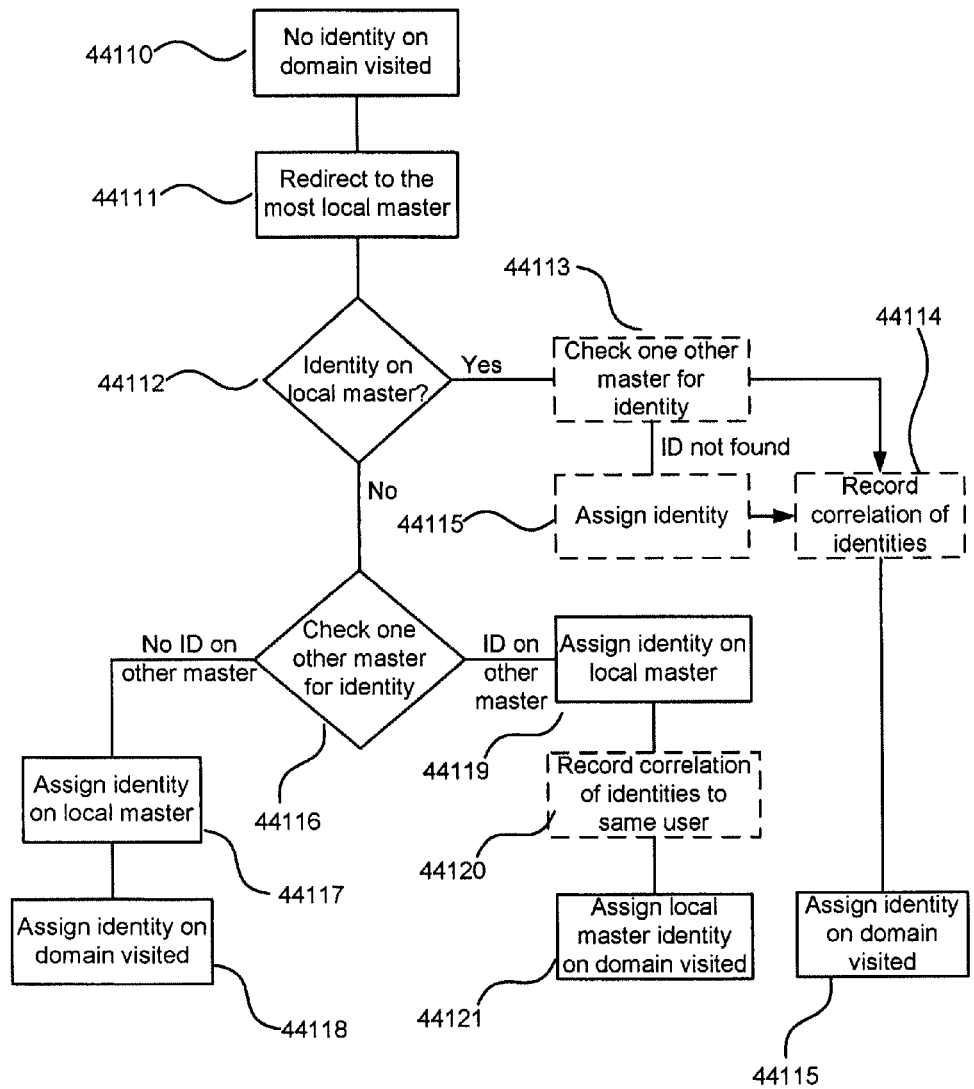
FIG. 44 shows a flow-chart of a method of assigning common identities in which more than one master domain assigns identities.

In order to further reduce the load on the master server, it is possible to utilise multiple domains to assign identities, each assigning a unique sub-set of identities to avoid duplication. Such a system utilises a peer-to-peer arrangement of master domains. For example, in the network of FIG. 42, both A and Z may be configured to be master domains. FIG. 44 shows a flow chart summarising the process of assigning identities in the network of FIG. 42, when both A and Z are configured to assign identities.

The client visits one of the slave domains for which it does not have an identity. At block 44110 the domain recognises the absence of a cookie as indicating that the client does not have an identity on the site and at block 44111 redirects the client to the most local master server. If the client has visited domains B, C, D or E, this will be A, if the client has visited domains V, W, X or Y, this will be Z.

At block 44112 the master server identifies whether the client has an identity on that server by checking for the presence of a cookie for that server. If an identity is found on that server, at block 44113 one other master server may also be checked for an identity for the client. This is done by redirecting the client to the other master to be checked and the other master ascertaining the presence, or absence, of a cookie for that master. If an identity is found for the client on that master, at block 44114 the relation of the two identities is recorded in a database, which can be utilised to correlate information gathered with regard to each of the individual identities. If at block 44114 no identity is found for the client, one may be assigned at block 44115 and its relation to the client's identity on the other master recorded in a database at block 44114.

The steps of checking another master for an identity, and the subsequent assignment or relating of those identities, are not essential to the performance of the method. However, the step of checking other masters for an identity, if not performed at the shown point in the method, must be performed at some point, otherwise a set of discreet identities will be developed with no link between them. In order to establish a common identity for a user links between identities that relate to the same user must be established. In alternative methods, one other server may be checked for an identity, but no new identity created if one is not found. Furthermore, more than one other master may be checked for identities, which may be advantageous when the network of masters grows very large. As will be appreciated, when there are more than two masters assigning identities, a selection of which master to check must be made. This selection may be made according to a predetermined pattern, algorithm or at random.

After block 44114, the client is redirected back to the visited site, together with an identity to be assigned to the user. That identity is passed to the user as described hereinbefore and the requested content served to the user.

If the local master does not have an identity for the user, one other master is checked at block 44116 for an identity for that user. That check is performed, as described in detail hereinbefore, by redirecting the user to the domain to be checking and ascertaining whether the user has a cookie for that domain. As explained previously in relation to block 44113, the other master to be checked may be selected by any suitable method.

If no identity is found for the user at block 44116, at blocks 44117 and 44118 a new identity is assigned on the local master and the domain visited using the methods described hereinbefore.

If an identity is found for the user at block 44116, an identity corresponding to that identity is assigned by the local master at block 44119 prior to redirection back to the domain visited. The identity assigned may be the same as that found on the other master, or may be a different identity that is related to the previous identity. If the identity is not the same as that on the other master, at block 44120 the correlation of the two identities is recorded in a database such that the relation of the two identities to the same user can be established. If the identities assigned are the same there is no need to record their correlation since their relation to the same user can be identified from the fact that the identities are the same. At block 44121 the identity assigned by the local master is also assigned by the domain visited and the content requested is served to the user.

This method therefore allows the establishment of a common identity for a user across a network of sites. Since a plurality of domains are responsible for assigning identities, the load on each domain is greatly reduced. By increasing the number of domains responsible for assigning identities the load on each domain is increased. However, identities assigned by different domains must be related to each other in order to develop a common identity. As the number of domains assigning identities increases, the task of relating those identities also increases as there is a greater likelihood of a single user having multiple identities assigned by different domains.

In the foregoing description, each time an identity is assigned by a domain, one other domain is checked for an identity for that user, and if one is found the relation is identified. Checking one domain each time a new identity is assigned for a new domain may not be sufficient to establish relations between all of the identities for a user where the number of domains assigning identities is large. It may therefore be required to check for other identities on a more regular basis. For example, each time a domain receives a request for content, one or more other domains may be checked for an identity for the user.

The process of checking for other identities and recording relationship consumes time and therefore delays any action that has triggered the check. It is therefore necessary to balance the delay caused by the checking against the need to perform sufficient checks to relate identities. The time taken to perform a check for an identity, or to assign a new identity, is proportional to the number of redirects, (hops) that are necessary to reach a domain which can assign an identity. As the size of the network grows, there is therefore a requirement for more masters to assign identities so that the number of hops to reach a master is always sufficiently small to cause an insignificant delay.

In an alternative system of establishing a common identity, but employing the same principles described in relation to other methods, a peer-to-peer system can be utilised to assign identities. In such a system all domains in a network are able to assign a sub-set of identities and so an identity can be assigned immediately upon receipt of a request for content. The identities assigned by each domain are then correlated and related to each other in a database to allow a common identity to be established across a network of domains.

Figure 46:
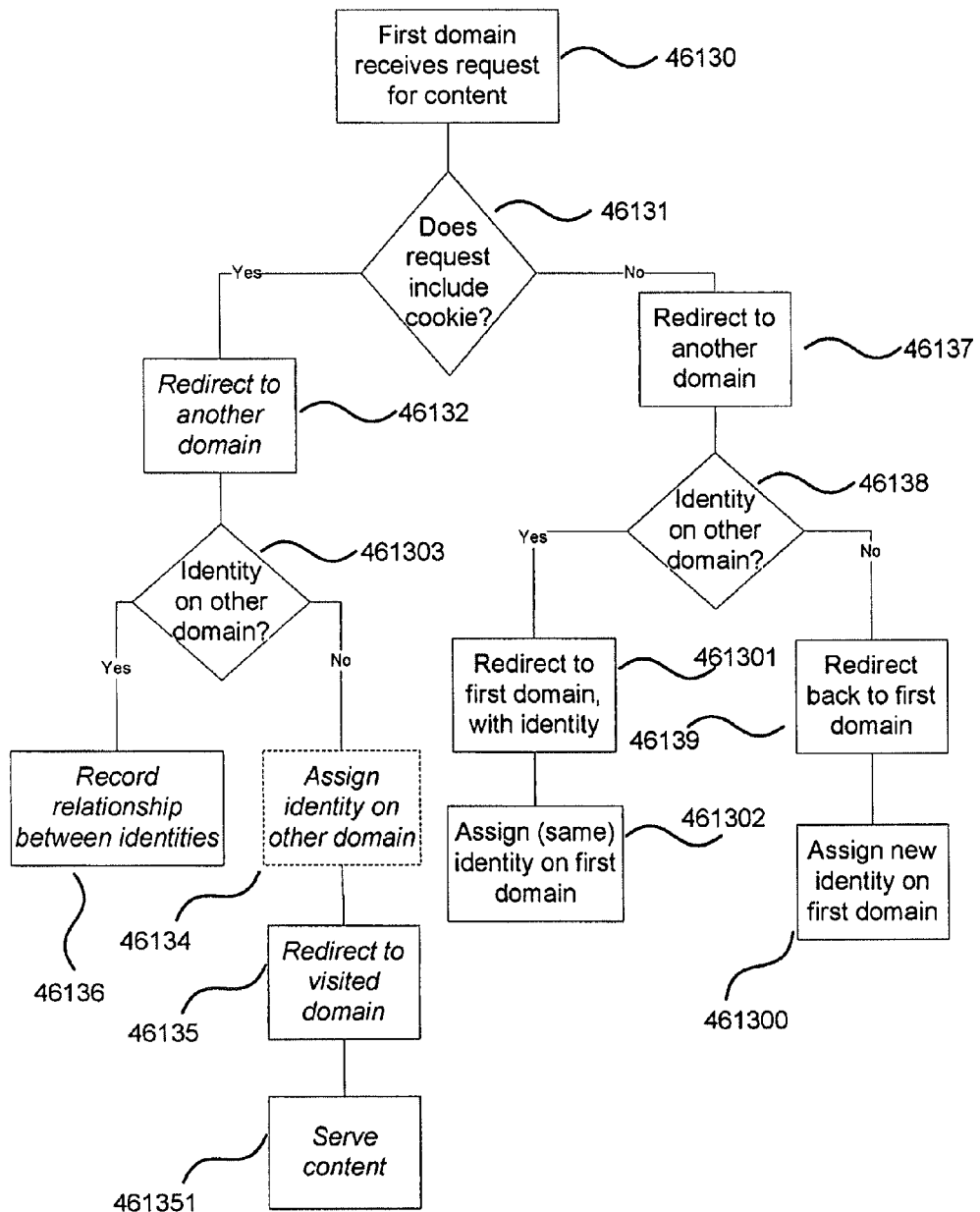
FIG. 46 is a flow-chart of a method of assigning identities utilising a peer-to-peer system.

FIG. 46 shows a flow-chart of a method of assigning identities utilised a peer-to-peer structure.

At block 46130 a domain receives a request for content from a client. At block 46131 the request is checked for the presence of a cookie, the presence of which indicates that the user has an identity on that domain. If the user does have an identity on the domain, at block 46132 the client is redirected to another domain in the network, which checks, at block 46133 for an identity on that domain.

If the user does not have an identity on the other domain, at block 46134 an identity corresponding to that on the domain visited may be assigned by that domain. Alternatively, a different identity may be assigned and related to the user's identity on the domain visited by a database. Either of these steps, however, are optional and there it is not essential to assign an identity for the other domain since that domain has not yet been visited to retrieve content. The client is then returned to the visited domain at block 46135 and subsequently the requested content is served at block 461351.

If the user does have an identity on the other domain, that identity is ascertained and the relation of the two identities to the same user is recorded in a database (Block 46136). Either of the identities may already be related to other identities of the user on different domains in the network, and so a mesh of related identities can be established across the network allowing a user to be identified at each of the domains.

If at block 46131 it is established that the user does not have an identity on the domain visited, the client is redirected to another domain at block 46137 to check, at block 46138, for the existence of an identity on the other domain. If no identity is found, the client is redirected back to the visited domain at block 46139 and a new identity is assigned by the visited domain and served together with the requested content at block 461300.

If at block 46138 the user does have an identity on the other domain checked, the client is redirected at block 461301 back to the domain visited. The user's identity on the other domain may also be sent to the domain visited. At block 461302 an identity is assigned to the user and the requested content served. The identity assigned may be the same as that sent by the other domain, or alternatively may be a different identity which is then related to the other identity using a database, as has been described previously.

In addition to the above checking of one other domain for an existing identity, further domains may also be checked. By checking more domains, the completeness of the common identity is increased, but the time taken to do the checking is increased. It is also possible to check for other identities at different points to those shown in the methods above. For example, every time the user requests content, a check may be made of one or more domains.

The other domains checked in these methods may be selected at random, or may be selected according to a predetermined algorithm or pattern.

In order to increase the efficiency of relating identities, an indication may be provided in the cookie of the domains on which an identity has been established and related to the current identity. For example, in a network having 4 domains, each domain may assign an identity that includes an indication of the domain to which the identity is related, and a list of other domains to which that identity has been related. If the client visits domain A first, the identity assigned may be "A1". This indicates that the identity is for domain A that it is identity number 1, and the absence of any other parameters shows that this identity has not been related to any other identities.

On a subsequent visit to domain A, the domain then picks another of the domains at random to check. If domain B is checked, and an identity is found and related to the A identity, the A cookie is updated to read "A1 B2" and the database storing identity relationships is updated. The "B2" part indicates that this identity is related to an identity number 2 on the B domain.

On a further visit to the A domain, it is apparent that the B domain has already been checked and so the domain elects to check either C or D. When the C domain is checked a C cookie containing "C3 D4" may be found, indicating that the user has an identity 3 on domain C and that that identity has been related to an identity 4 on domain D. These additional relationships are stored in the database and the A cookie can be updated to include "A1 B2 C3 D4", indicating that a complete set of identities has been established.

On subsequent visits to A, no checks for identities need be made as the A domain is aware that all identities are related to the A identity, thereby saving time and reducing unnecessary load on the domains.

At each of the above visits, the other cookies may also be identified. For example in the final visit to A, the C cookie may also be updated with the information already in the A cookie, such that the C cookie also indicates that the full set of relationships has been established.

The above example is only one example of possible methods of indicated established relationships between identities and there are many other possible schemes to provide the same functionality. For example, the cookies themselves may not be updated, but a database may be consulted by the domains to ascertain which relationships have already been established and to identify which other domains should thus be checked for related identities.

As per the above example, the identities assigned by each domain may include an indication of the domain that assigned them. This is a convenient method of providing an indication to other domains what the source of an identity is.

The inclusion of related identities in a cookie can also be utilised in conjunction with any of the other methods described herein to facilitate establishing a network of identities in an efficient manner.

Figure 47:
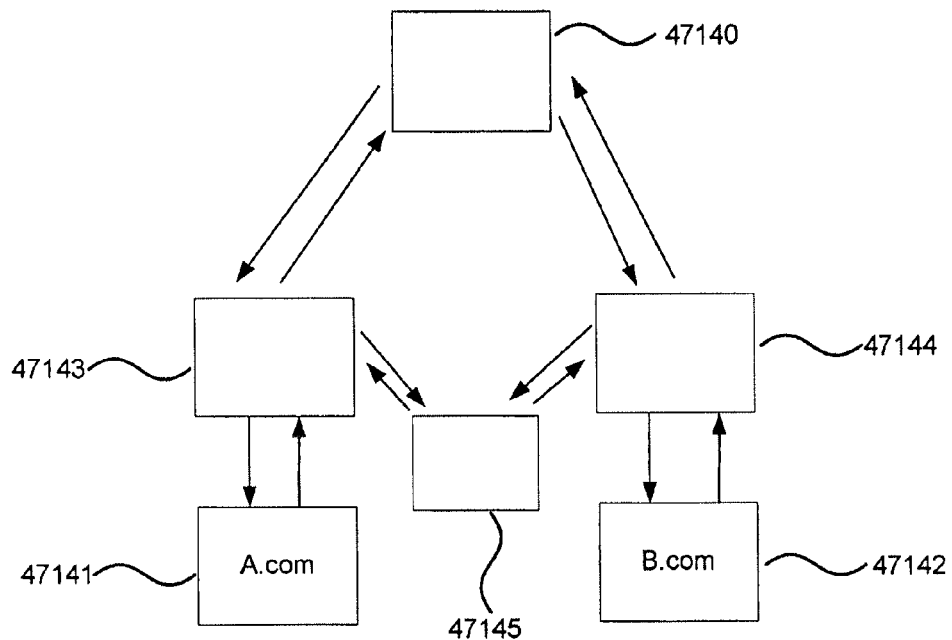
FIG. 47 is a schematic diagram of a network including identification systems for implementing methods according to the current invention.

In the foregoing description the identification services have been provided by the web-server serving the content for a given domain. FIG. 47 shows an alternative configuration in which an identification system, independent of the web-server, is utilised to provide and manage identities.

Client 47140 and domains 47141 and 47142 are conventional systems and operate as in a normal network. Identification systems 47143 and 47144 are connected to the network and are configured to communicate with client 47140 and their respective domain 47141 and 47142. The routing information for domains 47141 and 47142 is set such that all requests for content from those domains are first directed to the respective identification system. The identification system passes those requests on to the respective domain, and then on the return of content from the web-server passes the content on to the client. An identity management database 47145 may also be provided to maintain a database of identities and relations between identities, as has been explained previously.

The identification systems are configured such that they can view requests sent by the client, and in particular so that the identification system can view cookies for their respective domains, and pass cookies to the client for that domain. The identification systems thereby perform all of the functions described above as being performed by web-servers. Such a system allows the implementation of the identification methods described herein, without requiring modification of the operation of web-servers and without any additional load being placed on those servers. In FIG. 47, one identification system is show for one domain, but one system may, in fact, serve multiple domains. For example, a hosting company who hosts a large number of domains may utilise a single identification system for all of the domains hosted on their servers.

Figure 48:
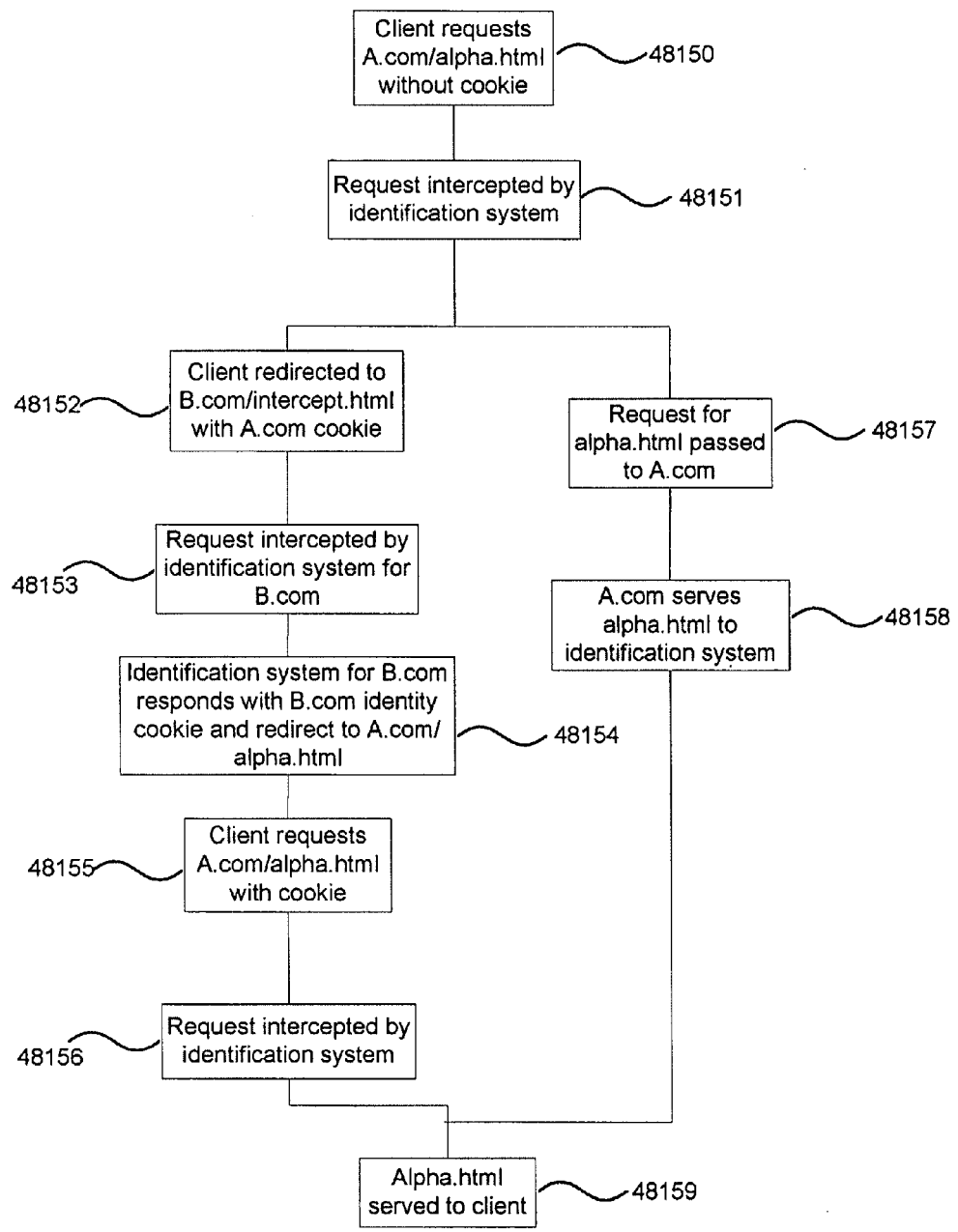
FIG. 48 is a flow-chart of a system for assigning a common identity utilising identification systems.

The identification systems implement the above-methods by intercepting and, as appropriate, amending requests and responses from and to the client. Many of the steps of the methods described hereinbefore can be performed exclusively by the identification system. Furthermore, some parts of the methods can be performed in parallel, thereby further improving the efficiency of the methods FIG. 48 shows a flow-chart of a method of assigning a common identity utilising the network of FIG. 47.

At block 48150 a client 48140 requests A.com/alpha.html without a cookie, because the user has not visited that domain before. At block 48151 the request is intercepted and processed by identification system 48143. The method then splits into two parallel paths to increase the efficiency of the system. However, it is also possible for the parallel steps to be performed sequentially, should that be required for any reason.

In a first path of the method at block 48152 the identification system 47143 responds to the client with a redirect to B.com/interecept.html, together with a cookie for A.com containing an identity and a parameter indicating the identity assigned. The client requests intercept.html from B.com and includes the parameters giving the identity to be assigned. At block 48153 the identification system 47144 for B.com intercepts the request and at block 48154 responds to the client with a B.com cookie corresponding to the identity passed by A.com together with a redirect to A.com/alpha.html. At block 48155 the client follows this redirect and requests A.com/alpha.html, which request is intercepted at block 48156 by the identification system 47143 for A.com.

The request for alpha.html is accompanied by a cookie and the identity of the cookie allows it to be correlated to the earlier request which began the process.

In the second path of the method at block 48157 the identification system 47143 for A.com passes the request for Alpha.html to A.com. At block 48158 A.com serves alpha.html, which is stored by the identification system 47143 for later transmission to the client.

Once the request of block 48155 has been intercepted at block 48156, and alpha.html has been received at block 48158, alpha.html is served to the client at block 48159.

The client has thus acquired both A.com and B.com cookies, and hence identities, and has also been served the requested content. The identification systems allow the efficiency of the system to be improved because parts of the method can be conducted in parallel and furthermore the tasks performed by the web-servers are significantly reduced. In this method, A.com only serves the requested page and B.com does not perform any steps. This is contrast to the implementation of the same method without the identification systems in which both A.com and B.com were required to perform a number of steps.

The identification systems only perform functions related to the establishment and management of identities and so can be configured particularly to those functions. The systems can therefore perform the tasks more efficiently than web-servers, which must also perform large numbers of other tasks.

Any of the methods described herein may be implemented using identification systems. Obvious modifications of the methods may be required in order that they work in conjunction with the identification systems and to ensure that they operate in the most efficient manner possible by making use of parallel paths in the methods and reducing the load placed on web-servers.

As will be apparent to the skilled person the above methods may be used in combination to provide the required assignment of identities. Furthermore, parts of the different methods may be combined.

As will be apparent to the skilled person, cookies sent by domains may contain additional information to the identity of the user to which they correspond. For example, cookies for a given domain may also contain information relating to the operation of a shopping system on that domain. The operation of the methods described herein is not affected by the inclusion of additional information in the cookie.

Where in the foregoing description reference has been made to assigning an identity to a client, this phrase is intended to describe the process of transmitting a cookie to the client having the identity.

In order to provide a more efficient assignment of identities, some or all of the domains used in the methods described herein may be domains that do not host any content, but are used purely in the assignment of identities. For example, it may be particularly beneficial for master domains to only be utilised to assign identities.

The domain and content names referred to throughout this document are used by way of example only and are in no way limiting.

Where reference is made to identities being the same, this does not necessarily require that the cookies sent relating to those identities are identical, but simply that there is a common feature of the two identities that indicates they are related to the same user. Furthermore, the relating of identities by a database has been described in relation to some of the methods described herein for which such a system is particularly suitable. However, such a database may be utilised in conjunction with any of the methods herein to relate identities rather than using the same identities.

Whilst in the above examples, the term 'revenue sharing' is used, it will be appreciated that this may refer to revenue generated on the basis of sales, profits, per access, per user, or any other metric.

In the figures and above description, the processing is described as taking place within a particular element (e.g. the web marketing platform or the real time analysis tool). However, parts of the processing and communication could alternatively be performed within the same entity (e.g. within one of the web marketing platform or the real time analysis tool or within a separate entity) in order to ensure faster processing of the critical elements or for other implementation or infrastructure reasons.

The entities shown in the figures may be geographically co-located or geographically remote. For example, the web marketing platform may be geographically remote from the server. The web marketing platform may in addition or instead be geographically remote from the host company The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of amending content transmitted from a server to a client, the method performed by a system configured to communicate with the server and the client, the method comprising:
configuring a domain name service to route requests for pages hosted at the server to the system such that the client sends the requests for the pages hosted at the server to the system;
receiving a request from the client to the server for a page hosted at the server, wherein the request has been sent by the client to the system as a result of the configuring of the domain name service;
transmitting the request to the server;
receiving a page from the server corresponding to the transmitted request;
searching the page for a predetermined item of content;
selectively amending content of the page to form a modified page on the basis of whether the predetermined item of content is found; and
transmitting the modified page to the client.

2. A method according to claim 1, wherein amending the content of the page comprises replacing the predetermined item of content in the page with a new predetermined item of content.

3. A method according to claim 2, wherein the predetermined item of content is related to an advertisement from a first advertisement provider and the new predetermined item of content is related to an advertisement from a second advertisement provider.

4. A method according to claim 1, wherein amending the content of the page comprises amending the predetermined item of content to include a link to related content.

5. A method according to claim 1, wherein amending the content of the page comprises amending the predetermined item of content such that a related part of the page is emphasized when that page is displayed by the client.

6. A method according to claim 1, wherein the predetermined content is a link, and amending the content of the page comprises amending the destination of the link.

7. A method according to claim 1, wherein the predetermined content is a word or phrase, and amending the content of the page comprises replacing that word or phrase with a different word or phrase.

8. A method according to claim 1, further comprising inserting additional content into the page.

9. A method according to claim 8, wherein the additional content is configured to cause the client to perform an action.

10. A method according to claim 9, wherein the action comprises the client requesting further content from a content provider, wherein the further content and content provider are specified by the additional content.

11. A method according to claim 9, wherein the action comprises recording information with regard to a user's behavior in relation to the received page.

12. A method according to claim 8, further comprising analyzing a structure of the page and selecting a point of insertion for the additional content at least partly on the basis of the structure of the page.

13. A method according to claim 8, wherein the additional content is inserted at a point at least partially dependent upon a type of the inserted content.

14. A method according to claim 1, wherein the system is geographically remote from the server.

15. A method according to claim 1, wherein the server is a web-server and the client is a web-browser.

16. A method according to claim 1, further comprising transmitting a reference to a frame-set to the client to cause the client to request the frame-set, wherein, at least one frame in the frame-set includes a reference to cause the client to display the page.

17. A method according to claim 16, further comprising:
receiving a request for the frame-set; and
transmitting the frame-set to the client.

18. A method according to claim 16, wherein the reference includes an indication that the reference was provided by the system, and wherein at least one frame in the frame-set includes a reference to additional content to be displayed with the requested page.

19. Apparatus for use in amending content transmitted from a server to a client, the apparatus being configured to communicate with the server and the client and to receive requests for pages hosted at the server on the basis of a domain name service having been configured to route requests for pages hosted at the server to the apparatus, such that the client sends the requests for the pages hosted at the server to the apparatus, the apparatus comprising:
at least one processor;
and at least one memory including computer program code;
the at least one memory and the computer program code being configured to cause the apparatus at least to:
receive a request from the client to the server for a page hosted at the server, wherein the request has been sent by the client to the apparatus as a result of the configuring of the domain name service to route requests for pages hosted at the server to the apparatus;
transmit the request to the server;
receive a page from the server corresponding to the transmitted request;
search the page for a predetermined item of content;
selectively amend content of page to form a modified page on the basis of whether the predetermined item of content is found; and
transmit the modified page to the client.

20. A computer program product comprising a non-transitory computer-readable storage medium having computer readable instructions stored thereon, the computer readable instructions being executable by a computerized device to cause the computerized device to perform a method of amending content transmitted from a server to a client, the method being performed by a system configured to communicate with the server and the client and to receive requests for pages hosted at the server on the basis of a domain name service having been configured to route requests for pages hosted at the server to the system, such that the client sends the requests for the pages hosted at the server to the system, the method comprising:

receiving a request from the client to the server for a page hosted at the server, —wherein the request has been sent by the client to the system as a result of the configuring of the domain name service;

transmitting the request to the server;

receiving a page from the server corresponding to the transmitted request;

searching the page for a predetermined item of content;

selectively amending content of the page to form a modified page on the basis of whether the predetermined item of content is found; and transmitting the modified page to the client.

* * * * *